(12) United States Patent  (10) Patent No.: US 9,149,006 B1
Pope  (45) Date of Patent: Oct. 6, 2015

(54) GARDEN MADE EZ MODULAR PLANTER DEVICE

(71) Applicant: Albert J. Pope, Washington, DC (US)

(72) Inventor: Albert J. Pope, Washington, DC (US)

( * ) Notice: Subject to any disclaimer, the term of this patent is extended or adjusted under 35 U.S.C. 154(b) by 0 days.

(21) Appl. No.: 14/625,477

(22) Filed: Feb. 18, 2015

(51) Int. Cl.
 *A01G 9/02* (2006.01)

(52) U.S. Cl.
 CPC ........................................ *A01G 9/02* (2013.01)

(58) Field of Classification Search
 CPC ......... A01G 9/02; A01G 9/104; A01G 9/025; A01G 9/027; A47G 7/04; A47G 7/00
 See application file for complete search history.

(56) References Cited

U.S. PATENT DOCUMENTS

| | | | |
|---|---|---|---|
| 1,229,022 A | | 6/1917 | Bolger |
| 4,120,119 A | | 10/1978 | Engel |
| 4,559,738 A | * | 12/1985 | Helfman ............................ 47/67 |
| 4,611,428 A | * | 9/1986 | Hakli ................................ 47/86 |
| 4,828,894 A | * | 5/1989 | Taylor ...................... 229/122.22 |
| 5,127,188 A | * | 7/1992 | Shaw et al. ........................ 47/68 |
| 5,511,342 A | | 4/1996 | Maso |
| 5,664,367 A | | 9/1997 | Huang |
| 5,852,895 A | | 12/1998 | Sinanan |
| 5,927,009 A | * | 7/1999 | Vanwingerden ................... 47/73 |
| 6,209,260 B1 | * | 4/2001 | Surette ........................... 47/65.5 |
| 6,837,002 B2 | | 1/2005 | Costa |
| 7,373,753 B1 | * | 5/2008 | Caruso .............................. 47/83 |
| 7,392,616 B1 | | 7/2008 | Bagby |
| 7,735,800 B2 | * | 6/2010 | Lunato et al. .................. 248/558 |
| 8,245,443 B1 | * | 8/2012 | Caruso .............................. 47/83 |
| 2005/0246956 A1 | | 11/2005 | Miguez |
| 2010/0313474 A1 | * | 12/2010 | Williams ........................ 47/65.7 |
| 2012/0011772 A1 | * | 1/2012 | Savage ........................... 47/65.6 |
| 2012/0260569 A1 | * | 10/2012 | Golgotiu et al. ................... 47/65 |
| 2013/0048586 A1 | * | 2/2013 | Pixler .............................. 211/85 |
| 2014/0075840 A1 | * | 3/2014 | Gosling et al. ..................... 47/81 |

FOREIGN PATENT DOCUMENTS

| | | | | |
|---|---|---|---|---|
| EP | 0288192 A1 | | 10/1988 | |
| EP | 1329152 | * | 7/2003 | ............... A01G 9/02 |
| FR | 2289110 | * | 7/1976 | ............... A01G 9/02 |
| WO | 98/49886 A1 | | 11/1998 | |

* cited by examiner

*Primary Examiner* — Kathleen Alker
(74) *Attorney, Agent, or Firm* — Patent Analysis Research Tech. Systems; George L. Walton

(57) ABSTRACT

A modular planter assembly having plural U-shaped planting containers including plural male open ends, drain holes in a bottom portion thereof and an underneath male drain channel, plural connectors having U-shaped cavities at each end and an underneath drain cavity with seal means disposed therein. The male open ends are secured within the U-shaped cavities and the drain channels are secured within the drain cavity of the connectors. Plural U-shaped end caps having U-shaped cavities with an underneath drain cavity with seal members disposed therein. Opposite male ends are secured within the end cap cavities and the male drain channel is secured within the drain cavity of the end caps forming a single planter assembly with a continuous drain channel to a drain adapter in the end caps to release excess water there from. Plural U-shaped brackets disposed about the containers to support and attach to an elevated wall structure.

30 Claims, 12 Drawing Sheets

GARDEN MADE EZ MODULAR PLANTER DEVICE

CROSS REFERENCE TO RELATED APPLICATION(S)

None

BACKGROUND OF THE INVENTION

1. Field of the Invention

The present invention relates generally to a modular planter or flower box assembly with a drainage means for relieving or evacuating excess water there from. The modular planter or flower box assembly consists of a plurality of longitudinal and angular modular sections that are joined together and supported by U-shaped support brackets to form a single unit. Each extreme end of the single unit includes an end cap for closing and sealing each end with drain means disposed therein for releasing excess water from the single unit.

2. Description of the Related Art

At the present time, there are many different types of modular planters or flower boxes with water drainage means that are made from material consisting of polypropylene (PP), Ethylene Propylene (EP) or Polyvinyl Chloride (PVC) that uses sealing adhesives and/or screws. These modular planters or flower boxes are used in gardens, on balconies, roof-tops, for residential dwellings, residential landscaped areas and in decorative and landscaped areas of commercial buildings and shopping facilities.

Many of these modular planter or flower box assemblies provide support brackets for connecting longitudinal and angular modular sections together are secured by screws or adhesive to hold the modular sections together to form a single continuous modular planter or flower box assembly unit that is adaptable to various or different types of areas to be gardened. The modular planter or flower box assemblies can be elevated by support posts with a drainage opening there through to drain excess water through a plurality of apertures in each end of the modular sections and other modular sections can have inner side double walls near the base of the modular sections with a plurality of ventilating holes near the top of the inner side double walls for evacuating excess water from the modular sections.

In light of the present invention, the best prior art patents that was found, teaches longitudinal and angular modular sections interconnected with one another by support brackets to from a single and continuous planter or flower box assembly unit with drainage means to be positioned in an area to be gardened. Also, a cover is secured to each end of the single and continuous planter or flower box assembly unit for closing and sealing each end modular sections thereof. These prior art patents are now described below.

U.S. Pat. No. 4,120,119 A describes a continuous modular sectional flower box unit with longitudinal trough-like receptacles that are connected together by an angular elbow coupler receptacle with open flanged ends dimensioned to fit snugly within and against inside surfaces proximate an open end of the longitudinal trough-like receptacles and rigidly secured together by glue or screws.

The other ends of the longitudinal trough-like receptacles is covered by an end cap with a wall-like member having a flange projecting outward from its bottom and side edges. This end cap is dimensioned to ensure that the flange will fit snugly across the width of and against an inside surface of an open end the longitudinal trough-like receptacles, for rigid attachment thereto by suitable means, such as glue or screws. Also, a splicer and stiffener plate with a flange are dimensioned to fit across the width of and snugly against inside surfaces proximate the open ends of two of the longitudinal trough-like receptacles that are abutted together and rigidly secured thereto by attachment means such as, glue or screws.

U.S. Pat. No. 5,664,367 A describes an artistic flower planting box that is hangable on a building terrace or patio having a flower planting box and a hanging plate. The hanging plate is channel shaped and placed on an upper surface of a terrace wall of a building. The flower planting box is elongated in shape with an upper open side, forming and interior for soil and flowers. The flower planter box is assembled with the hanging plate by bolts screwing into a plurality of threaded holes in a rear side of the flower planter box and a front side of the hanging plate.

U.S. Pat. No. 5,852,895 A describes a raised planter box assembly having a plurality of U-shaped modular planter boxes connected to one another with an open top end portion to allow easy access for planting purposes. The top open end allows a plurality of sliding plates or dividers to be releasably secured therein to form separate planting compartments within the raised planter box assembly. A plurality of drain holes is disposed at each end of each modular planter boxes.

Also, a spaced apart support structure having one end attached to a bottom surface of each of the U-shaped modular planter boxes for elevating the planter box assembly above the ground or floor surfaces. These spaced apart support structures include spaced apart height adjusting elevating posts with a through opening therein for communicating with the plurality drain holes to relieve excess water or fluid from the planter box assembly. The other end of the support structure height adjusting elevating posts being in the form of a spike that is disposed in the ground or a platform end portion that is supported by a floor surface, if desired.

U.S. Pat. No. 6,837,002 B2 describes a plurality of modular tray sections for hydroponic and aeroponic cultivation, in which a nutritive solution is carried to the roots of plants grown in the tray sections by a tube with a plurality of holes for built-in drips, which is situated in a longitudinal slot disposed in the bottom surface of the tray sections. The trays consist of at least one plastic casing made by extrusion. A pair of closing end flange plates being fixed to the ends of the tray sections.

At least one middle flange plate is disposed between the tray sections to connect them together as a continuous unit with a watertight seal. Note that this least one middle flange plate includes a plurality of holes disposed therein, a middle hole being utilized for receiving the tube there through and the other holes being disposed on opposite sides of the middle hole, which are utilized to intercommunicate the tray sections to allow the smooth flowing of the nutritive solution into the modular tray sections.

U.S. Patent Application Publication No. 2005/0246956 A1 describes a plurality of U-shaped modular double walled flower boxes having a pair of sides and a bottom base connecting surface that are joined to one another to form a continuous flower box assembly with releasably secured end caps. A plurality of support coupling brackets for joining the plurality of modular double walled flower boxes together by a fastening or screw means to form a leak proof structure in which self watering systems can be installed. These support coupling brackets can take on different angular configurations, such as angles of 90° or 135°.

The modular double walled flower boxes having interior double wall drain channels on both sides of the modular double walled flower boxes at a bottom end thereof adjacent the bottom base connecting surface to allow each drain channels to abut one another to form a connecting relationship through out the continuous flower box assembly. The drain channels include a number of drain holes disposed at a top end thereof, where excess water is evacuated from and allows the roots of the flowers or vegetation and the earth or soil to be ventilated.

A bracket member being coupled onto the top end of the aforementioned support coupling brackets for the attachment of a lighting element thereto.

WO 1998/049886 A1, an International Patent Application Publication, published under the Patent Cooperation Treaty (PCT), is cited as being the same as U.S. Pat. No. 5,852,895 A as described above. A description of this International Patent Application Publication (PCT) will not be described in detail, since it is the same as the aforementioned U.S. Pat. No. 5,852,895 A.

Note that none of the above mentioned prior patents teaches singly or in combination the unique present invention, which will be discussed in greater detail in the "Summary of the Invention" recited below.

SUMMARY OF THE INVENTION

It is an object of the present invention to provide an improved continuous leak-proof modular planter or flower box assembly unit where all the components thereof are preferably made of a material selected from the group of polymer type materials consisting of polypropylene (PP), Ethylene Propylene (EP) or Polyvinyl Chloride (PVC), other known plastics, hard rubber-like material and metals, such as aluminum and stainless steel. Also, it is to be noted that many other types of materials could be utilized, if desired. These materials will withstand extreme temperatures. This in no way will depart from the spirit of the present invention or the scope of the appended claims.

It is another object of the present invention to provide a plurality of molded elongated modular planter or flower box sections of different lengths and/or sizes with a pair of upstanding side walls and a bottom wall that connects to the pair of side walls at their lower ends with an open upper end forming a U-shaped configuration. Each end of the plurality of molded elongated modular planter or flower box sections defines a U-shaped male end portion with at least a pair of fastening holes disposed therein. A plurality of spaced apart drain holes is disposed in the bottom wall of the plurality of molded elongated modular planter or flower box sections.

The bottom wall of each of the plurality of molded elongated modular planter or flower box sections includes a longitudinal molded male semi-circle shaped or a C-shaped configuration drain channel extending downward below an underneath surface of the bottom wall of the plurality elongated modular planter or flower box sections along an entire length thereof, which communicates with the plurality of spaced apart drain holes disposed in the bottom wall of each of the plurality of molded elongated modular planter or flower box sections.

It is a further object of the present invention to provide a plurality of molded coupling connectors of different angular dimensions, lengths and sizes. Each of the coupling connectors having a pair of upstanding side walls with opposite open ends, a bottom wall portion that interconnects the pair of upstanding side walls at a lower end, the pair of upstanding side walls and the opposite open ends having an upper open end extending there between and a double-walled U-shaped female cavity disposed within the opposite open ends thereof with a semi-circle or C-shaped female drain cavity extending below and along the entire length of the bottom wall portion, the double-walled female cavity having a selected depth therein defined by a back wall portion therein for receiving and stopping the U-shaped male end portions of the plurality of molded elongated modular planter or flower box sections when fully inserted into the cavity of the double-walled female end portions of the plurality of molded coupling connectors and simultaneously the longitudinal molded male semi-circle shaped or the C-shaped configuration drain channels of the plurality of molded elongated modular planter or flower box sections are fully inserted into the semi-circle or C-shaped female drain cavity of each of the plurality of plurality of molded couling connectors.

At least a pair of fastening holes are disposed in the double-walled female end portions to align with the at least a pair of fastening holes in the U-shaped male end portions of the plurality of molded elongated modular planter or flower box sections. This alignment of the fastening holes of the U-shaped male end portions of the plurality of molded elongated modular planter or flower box sections and the double-walled female end portions of the coupling connectors receives a fastening member to secure and sealingly tighten the plurality of molded elongated modular planter or flower box sections and the coupling connectors together as a single unit.

The fastening member can be selected from the group consisting of pins, such as, dowel pins, cotter pins, straight or tapered pins, split pins, threaded fasteners, such as, screws, screw and nuts, captive threaded fasteners, threaded inserts, threaded rods, screw anchors, anchor bolts, rivets, clips, pegs, clamps and clasps to name just a few.

It is also another object of the present invention to provide a molded U-shaped seal member having a pair of upstanding or vertically extending side leg portions and a bottom horizontal leg portion that interconnects with the pair of upstanding or vertically extending side leg portions at its lower ends. The bottom leg portion further includes a molded C-shaped or semi-circle shaped seal member with an opening there through that extends downward there from and into alignment and sliding sealing engagement within the female drain channels of the plurality of molded coupling connectors.

When fully inserted into the cavity of the double-walled female end wall portions of the plurality of coupling connectors, the pair of upstanding or vertically extending side leg portions and the bottom leg portion of the U-shaped seal member will abut and seal against the double-walled cavity back wall portion therein. The C-shaped or semi-circle shaped configuration that extends downward from the bottom leg portion of the U-shaped seal member with the opening there through will then stop and become tightly conformed and sealed against the interior walls of the female drain channels of the plurality of molded coupling connectors, when the pair of upstanding or vertically extending side leg portions and the bottom leg portion of the U-shaped seal member abut and seal against the double-walled cavity back wall portion of the plurality of molded coupling connectors.

After the molded U-shaped seal member has been fully inserted into the cavity of the double-walled female cavity end portions, the U-shaped male end portions of the plurality of molded elongated modular planter or flower box sections is then inserted therein until the U-shaped male end portions of the plurality of molded elongated modular planter or flower box sections abut up against and seal against the pair of upstanding or vertically extending side leg portions and the bottom horizontal leg portion of the molded U-shaped seal member, and the molded C-shaped or semi-circle shaped seal member will come to a corresponding stop within the female drain channels of the plurality of molded coupling connectors and into a tight sealing engagement with the interior walls of the double-walled female cavity end portions.

When the U-shaped male end portions of the plurality of molded elongated modular planter or flower box sections have been fully inserted into the cavity of the double-walled female cavity end portions, then the longitudinal molded male semi-circle shaped or a C-shaped configuration drain channels will be become fully and tightly inserted into the female drain channels of the plurality of molded coupling connectors and into sealing engagement against the molded C-shaped or semi-circle shaped seal member within the female drain channels of the plurality of molded coupling connectors.

Then the aligned fastening holes of the U-shaped male end portions of the plurality of molded elongated modular planter or flower box sections and the double-walled female end portions of the coupling connectors receives the fastening member there through to secure and sealingly tighten the plurality of molded elongated modular planter or flower box sections and the coupling connectors together. This action will cause a compressing and bulging of the U-shaped seal member within the cavity of the double-walled female end wall portions of the plurality of coupling connectors and the molded C-shaped or semi-circle shaped seal member within the female drain channels of the plurality of molded coupling connectors to prevent or eliminate any leakage between the plurality of U-shaped male end portions of the molded elongated modular planter or flower box sections and the plurality of double-walled female end portions of the coupling connectors that are connected together to form a continuous E-Z planter or flower box unit.

It is yet a further object of the present invention to provide a pair of end caps having one end with a pair of upstanding or vertical side walls and a lower bottom horizontal wall interconnected to the pair of upstanding or vertical side walls at the lower end thereof and another end having a flat surface area with a top end and a bottom end. The bottom end includes a semi-circle or C-shaped area extending integrally downward and centrally there from with a flow opening disposed therein. The pair of upstanding or vertical side walls and the lower bottom horizontal wall defines a U-shaped double-walled cavity formed therein on one side of the pair of end caps with a back or end wall portion defining the depth of the U-shaped double-walled cavity to receive the other ends of the U-shaped male end portions of the plurality of molded elongated modular planter or flower box end sections opposite the U-shaped male end portions that are interconnected to the end coupling connectors of the continuous unit. Below the lower bottom wall of the U-shaped double-walled cavity, a semi-circle or C-shaped female drain channel extends integrally downward there from.

A similar molded U-shaped seal member having a pair of upstanding or vertically extending side leg portions and a bottom horizontal leg portion that interconnects with the pair of upstanding or vertically extending side leg portions at its lower ends to be inserted into the U-shaped double-walled cavity of the pair of end caps. Also, the bottom leg portion further includes a molded C-shaped or semi-circle shaped seal member with an opening there through that extends downward there from and into alignment and sliding sealing engagement within the semi-circle or C-shaped female drain channels or cavities of the pair of end caps. This happens when the pair of upstanding or vertically extending side leg portions and the bottom horizontal leg portion comes into a stop abutment against the back wall portion of the U-shaped double-walled cavity of the end caps after the U-shaped seal member has been fully inserted therein.

It is to be noted that the other male end portion of the semi-circle or C-shaped drain channels of the plurality of molded elongated modular planter or flower box end sections opposite the U-shaped male end portions that are interconnected to the end coupling connectors of the continuous unit, will be inserted into the semi-circle or C-shaped female drain channels or cavities of the pair of end caps and into an abutting and sealing stop engagement with the molded C-shaped or semi-circle shaped seal member of the bottom leg portion of the U-shaped seal member. This abutting and sealing stop engagement defines a tight sealing arrangement there between.

The end caps include at least a pair of fastening holes in the pair of upstanding or vertical side walls thereof, which aligns with the pair of fastening holes disposed in the ends of the plurality of elongated molded elongated modular planter or flower box sections opposite the fastening holes that cooperates with the coupling connectors. Once these fastening holes are aligned with one another, a fastening member is inserted there through to secure and sealingly tighten the plurality of molded elongated modular planter or flower box sections and the end caps together to close off the two open ends in the continuous unit.

This fastening member will cause a compressing and bulging of the U-shaped seal member within the cavity of the double-walled female back or end wall portions of the pair of end caps and the molded C-shaped or semi-circle shaped seal member within the female drain channels or cavities of the pair of end caps to prevent or eliminate any leakage between the other ends of the plurality of U-shaped male end portions of the molded elongated modular planter or flower box sections and the double-walled female end portion of the end caps that are connected together to complete and close the continuous E-Z planter or flower box unit.

The flat surface area top and bottom ends of the end caps are integrally joined to the pair of upstanding or vertical side walls. The flow opening is disposed in the centrally and downward extended semi-circle or C-shaped area of the flat surface area bottom end, which is configured and is in flow communication with the semi-circle or C-shaped female drain channel or cavity in each end cap and the interconnected semi-circle or C-shaped male drain channels in the plurality of molded elongated modular planter or flower box end sections of the continuous E-Z planter or flower box assembly unit defining a continuous drain passage there through. A drain hose adapter is connected to the flow opening disposed in the centrally and downward extended semi-circle or C-shaped area of the flat surface area bottom end by a threaded means and the continuous drain passage to release or evacuate excess water from the continuous E-Z planter or flower box assembly unit The drain hose adapter includes a first front threaded area to be secured in the flow opening, a stop member behind the first front threaded area engages the front downward extended semi-circle or C-shaped area of the flat surface area bottom end to indicate full insertion within the flow opening, a wrench nut outward of the stop member adapted for a wrench or other tool means for inserting and removing the drain hose adapter from the flow opening and a second rear threaded area outward of the wrench nut that is adapted for receiving a cap member to close off the drain hose adapter during shipping or when the continuous molded E-Z planter or flower box assembly unit is not in use.

Then a drain hose is adapted to be connected to the threaded hose adapter to drain or evacuate excess water from the continuous molded E-Z planter or flower box assembly unit through the continuous drain passage to a desired drain location. This will prevent water damage to deck floors, greenhouse or atrium floors, and any other areas where the continuous molded E-Z planter or flower box assembly unit is located. Also, it prevents ground areas from being soaked or muddy around and under the continuous molded E-Z planter or flower box assembly unit. Note that the excess water that is drained can be recycled continuously or stored in a reserve unit or tank that can be used whenever deemed necessary.

A further object according to the present invention provides a threaded cap member with a central handle member extending across a major front surface thereof to allow a user to actuate the threaded cap member for easy cooperation with the threaded adapter by hand. Optionally, the handle can use a wrench to tighten the cap about the hose adapter and to remove the cap from the hose adapter, if desired. The handle further includes a central opening therein to allow a screw driver to be inserted therein in order to actuate the cap member when it is to be removed from the hose adapter.

The threaded cap member includes a back or rear surface having a threaded cavity defining a depth therein that will allow it to be fully secured on the threaded adapter when a rear surface outer peripheral portion of the cap abuts or engages the wrench nut of the drain hose adapter.

It is to being noted that the threaded drain hose adapter and the threaded cap member could be secured by various other means, if desired.

A further object according to the present invention provides a plurality of different types of support brackets for supporting and elevating the improved molded continuous leak-proof modular E-Z garden planter or flower box assembly unit. These different types of support brackets include the following:

1) a U-shaped support bracket with a pair of upstanding leg portions with the fastening hole in the leg portion of greater length to receive a fastening member therein to secure the bracket to the molded elongated modular planter or flower box assembly unit and a bottom horizontal interconnecting leg portion including a downward semi-circle or C-shaped area for supporting and conforming to the semi-circle or C-shaped drain channels of the molded elongated modular planter or flower box assembly unit for stabilizing the molded elongated modular planter or flower box assembly units.

2) a U-shaped support bracket having a pair of upstanding leg portions with one of the leg portions being of a greater length that includes a L-shaped or hook-like member to be hung and supported across a top surface of a wall member and a bottom horizontal interconnecting leg portion including a downward semi-circle or C-shaped area for supporting and conforming to the semi-circle or C-shaped drain channels of the molded elongated modular planter or flower box assembly unit for stabilizing the molded elongated modular planter or flower box assembly unit.

3) a pair of U-shaped support brackets having a pair of upstanding leg portions with one of the leg portions of each pair being of greater length being connected together by an elongated leg member forming a support member to double hang and support a plurality of modular planter or flower box units across a top surface of a wall member on opposite sides thereof and a bottom horizontal interconnecting leg portion of each pair including a downward semi-circle or C-shaped area for supporting and conforming to the semi-circle or C-shaped drain channels of the molded elongated modular planter or flower box assembly unit for stabilizing the molded elongated modular planter or flower box assembly units.

The aforementioned wall member can be a top wall structure of decks, patios, balconies, windows, porches, roof tops, fences, brick and/or concrete barrier walls, other building wall structures and any other elevated surface. The wall member allows the molded elongated modular planter or flower box assembly unit to be elevated above the ground to prevent small garden animals, such as gophers, moles, rabbits and ground hogs from consuming plants and/or vegetation, which increase the yield of plants and/or vegetation harvest. This molded elongated modular planter or flower box assembly unit has the ability to be mounted on any surface from 1 inch to 6 feet. However, other distances could be utilized, if desired.

It is to be noted that the molded E-Z planter or flower box assembly unit supports general urban and rural residential gardening and plant matter, including experimental and testing for commercial, industrial, laboratory and agricultural use. This molded E-Z planter or flower box assembly unit is designed for people who are disable and handicap and people who use canes, walkers and wheel chairs can bring the love for gardening to their home without strenuous labor and time. Also, it is an easy way for non-gardeners to learn how to grow plants, vegetables and/or flowers with little effort and time. In addition, it is very easy and non-time consuming for any one to assemble the molded E-Z planter or flower box assembly unit Additional aspects, objectives, features and advantages of the present invention will become better understood with regard to the following description and the appended claims of the preferred embodiments with reference to the accompanying drawings.

BRIEF DESCRIPTION OF THE DRAWINGS

The present invention may be better understood, along with its numerous objects, features, and advantages made apparent to those skilled in the art by referencing the accompanying drawings.

FIG. 3 illustrates a cut sectional isometric view of a molded elongated modular planter or flower box sectional unit with a with a semi-circle or C-shaped drain channel disposed below a bottom wall surface of the molded elongated modular planter or flower box sectional unit according to the present invention.

DETAILED DESCRIPTION

Figure 1:
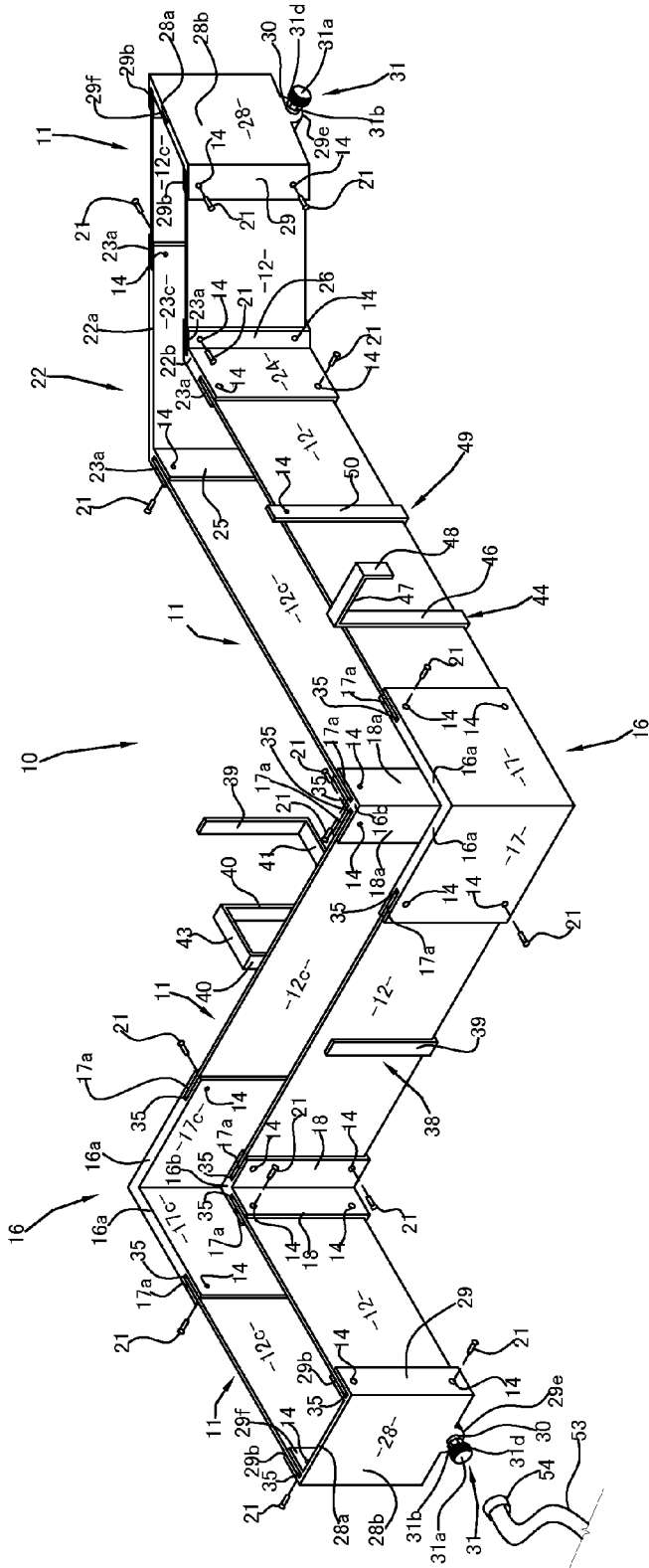
FIG. 1 illustrates a perspective view of a molded continuous and modular E-Z garden planter or flower box assembly unit having a pair of double-walled end cap drain devices according to the present invention.
Figures 11, 11A:
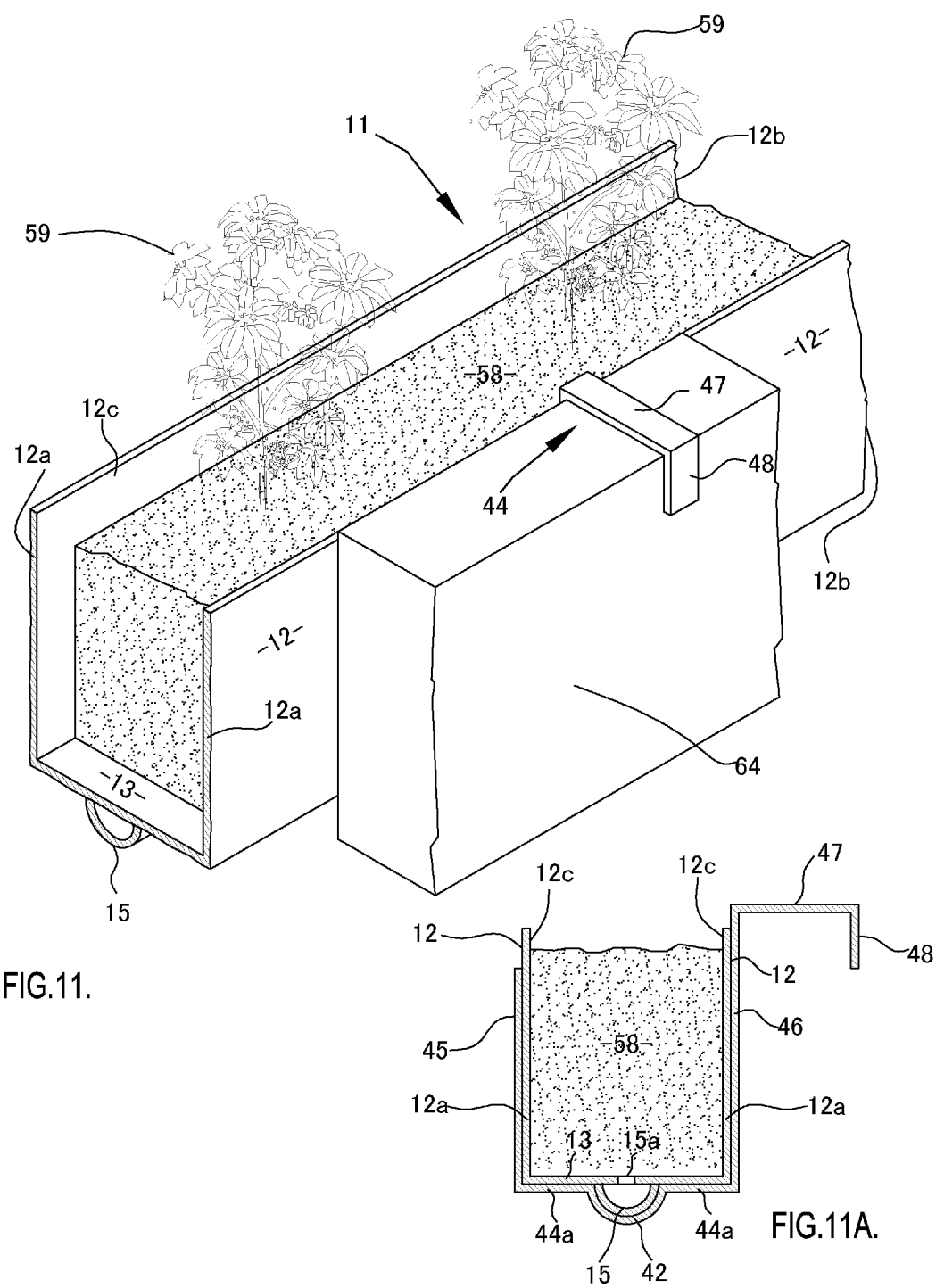
FIG. 11 illustrates a cut-sectional perspective view of a molded elongated modular planter or flower box sectional unit including soil for planting flowers, vegetation or plants therein with a U-shaped bracket member with a L-shaped or hook-like member to be hung and supported across the top of a wall surface and supporting and conforming to drain channels disposed on a bottom surface of the molded elongated modular planter or flower box sectional unit according to the present invention.
FIG. 11A illustrates a front perspective view of the molded elongated modular planter or flower box sectional unit including soil for planting flowers, vegetation or plants therein with a U-shaped bracket member with a L-shaped or hook-like member to be hung and supported across the top of a wall surface and a downward semi-circle or C-shaped area for supporting and conforming to the bottom disposed drain channels of the molded elongated modular planter or flower box sectional unit according to the present invention.
Figure 12:
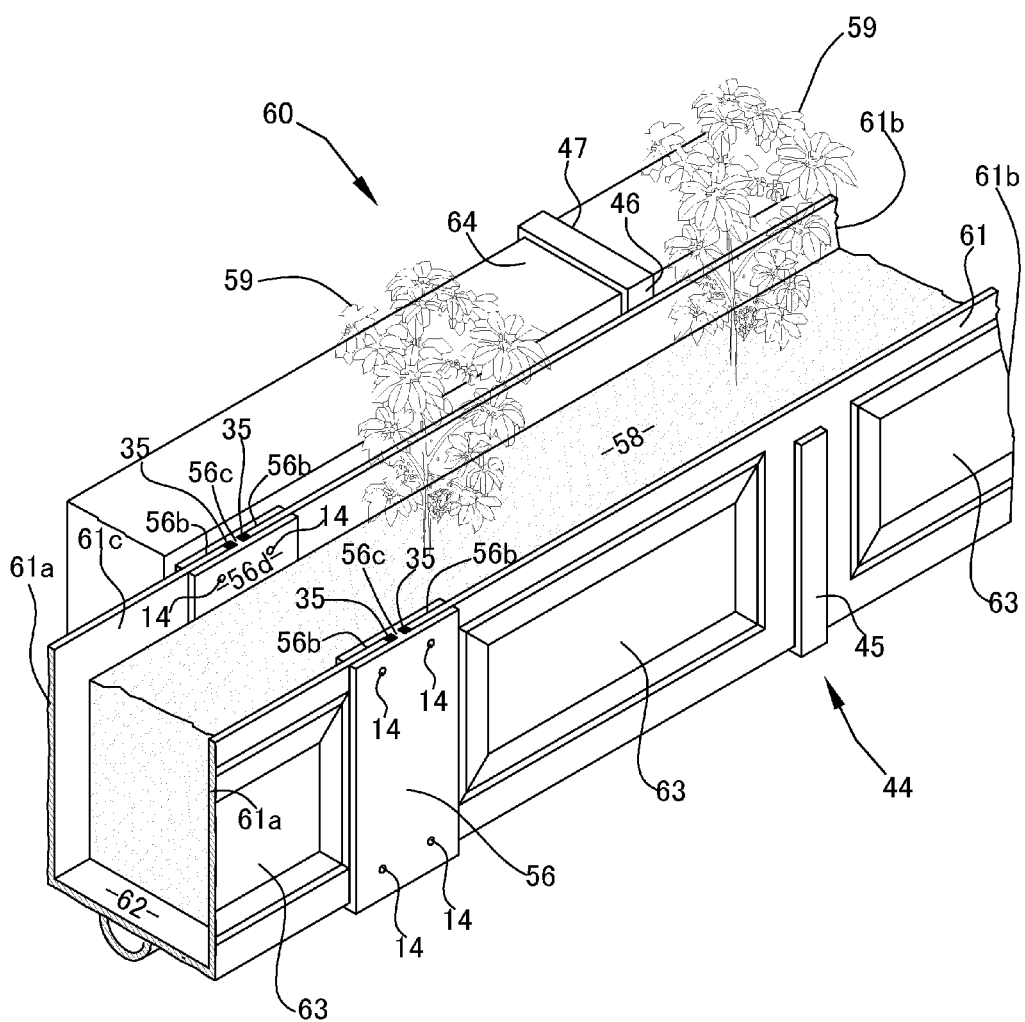
FIG. 12 illustrates a cut-sectional perspective view of a plurality of decorative side walls of a molded elongated modular planter or flower box sectional unit joined together by a 180° double-walled coupling connector and including soil for planting flowers, vegetation or plants therein with a U-shaped bracket member with a L-shaped or hook-like member to be hung and supported across the top of a wall surface and supporting and conforming to drain channels disposed on a bottom surface of the molded elongated modular planter or flower box sectional unit and according to the present invention.

FIG. 1 illustrates a perspective view of an improved molded continuous modular and leak-proof E-Z garden planter or flower box assembly unit 10 having a plurality of elongated planter or flower box section members 11, a plurality of double-walled end coupling connectors 16, 22 and 55 (shown in FIGS. 4 and 12), a plurality of sealing members 34 to be received within the plurality of double-walled end coupling connectors 16, 22 and 55, a pair of double-walled end cap members 28 for closing off the pair of extreme ends of the last two elongated planter or flower box section members 11 and a plurality of support brackets for supporting and securing the molded continuous modular and leak-proof E-Z garden planter or flower box assembly unit 10 to a wall structure or member 64 (shown in FIGS. 11 and 12).

It is being noted that all of the components of the improved continuous leak-proof and modular planter or flower box assembly unit 10 are preferably made of a material selected from the group of polymer type materials consisting of Polyvinyl Chloride (PVC), polypropylene (PP), or Ethylene Propylene (EP), other known plastics, hard rubber-like material and made of a material selected from the group of metal materials consisting at least of aluminum and stainless steel. Also, it is to be noted that many other types of materials could be utilized, if desired. These preferred materials are able to withstand extreme temperatures.

The plurality of molded elongated modular planter or flower box section members 11 include a pair of upstanding inner side walls 12c and outer side walls 12, and a bottom wall 13 that connects to the pair of inner side walls 12c at their lower ends with an open upper end forming a U-shaped configuration. Each end of the plurality of molded elongated modular planter or flower box section members 11 defines a U-shaped male end portion 12a and 12b with at least a pair of spaced apart fastening holes 14 disposed therein. A plurality of spaced apart drain holes 15a (shown in FIGS. 3, 3A and 3B) is disposed in the bottom wall 13 of the plurality of molded elongated modular planter or flower box section members 11. Note that the plurality of molded elongated modular planter or flower box section members 11 can be of different dimensions in lengths, widths and thicknesses.

Also, the bottom wall 13 of each of the plurality of molded elongated modular planter or flower box section members 11 includes a longitudinal molded male semi-circle shaped or a C-shaped configuration drain channel 15 extending downward below an underneath surface of the bottom wall 13 of the plurality elongated modular planter or flower box section members 11 along an entire length thereof, which communicates with the plurality of spaced apart drain holes 15a (shown in FIGS. 3, 3A and 3B) disposed in the bottom wall 13 of each of the plurality of molded elongated modular planter or flower box section members 11. The longitudinal molded male semi-circle shaped or a C-shaped configuration drain channel 15 being of a first diameter that will be discussed in greater details later.

Figure 4:
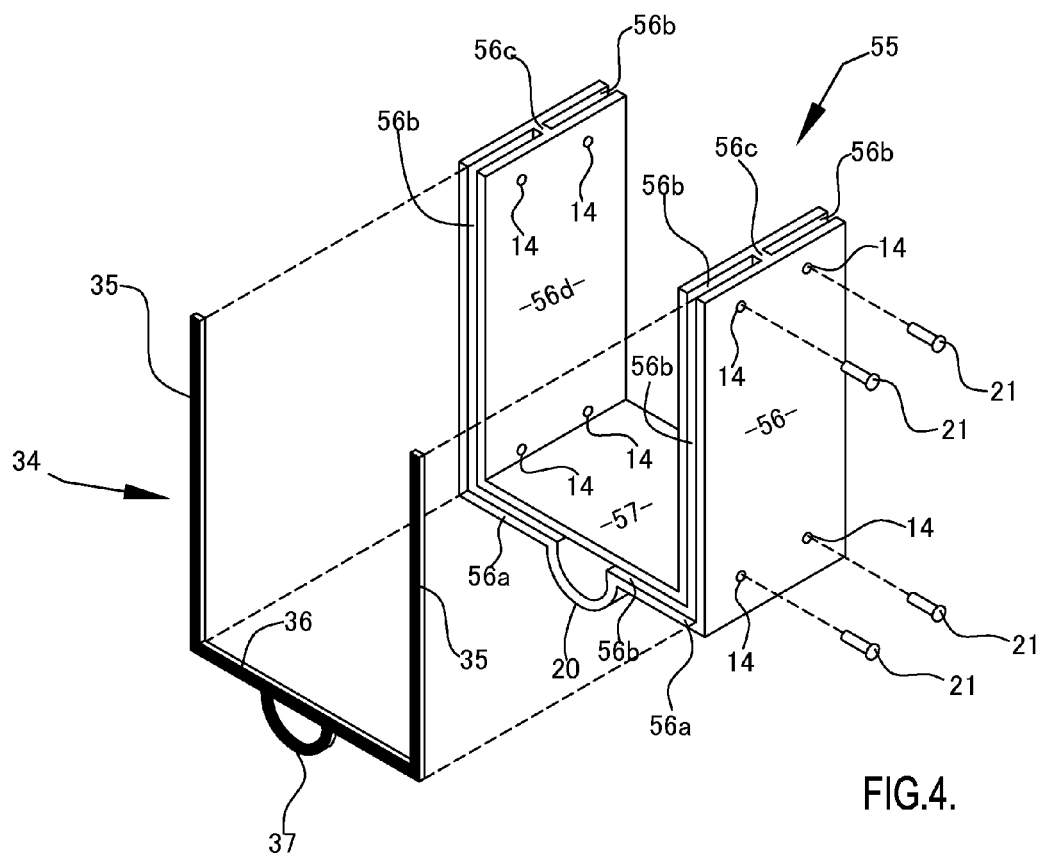
FIG. 4 illustrates an exploded isometric view of a 180° coupling connector with double-walled ends and seal member assembly utilized in the molded continuous and modular E-Z garden planter assembly unit according to the present invention.
Figures 4A, 4B:
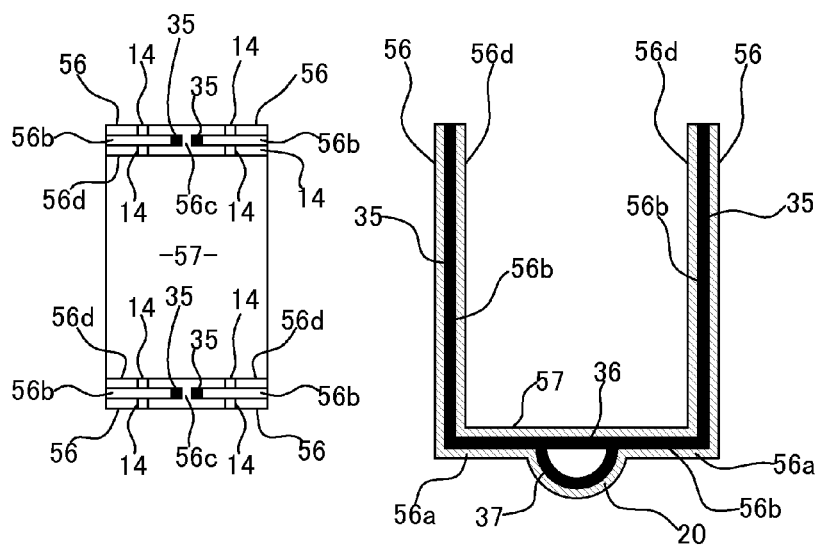
FIG. 4A illustrates a top perspective view of the 180° coupling connector with double-walled ends and seal member assembly utilized in the molded continuous and modular E-Z garden planter assembly unit according to the present invention.
FIG. 4B illustrates a front perspective view of the 180° coupling connector with double-walled ends and seal member assembly utilized in the molded continuous and modular E-Z garden planter assembly unit according to the present invention.

Next, the coupling connectors 16, 22, and 55 as (shown in FIGS. 5, 5A and 5B, 6, 6A and 6B and 4, 4A and 4B, respectively) have a pair of ends forming double-walled female end portions defining a cavity 17a, 23a and 56b (FIGS. 4, 4A and 4B) with a back wall portion 17b, 23b and 56c (as shown in FIGS. 4, 4A and 4B) respectively, therein for receiving and stopping the U-shaped male end portions 12a and 12b (see FIG. 2) of the plurality of molded elongated modular planter or flower box section members 11a against a sealing member leg portion 35 of a sealing member 34 when fully inserted into the respective cavities 17a, 23a and 56b of the double-walled female end portions of the plurality of molded coupling connectors 16, 22, and 55. The sealing member 34 will be discussed in greater details in the upcoming Figures. The U-shaped male end portions 12a and 12b of the plurality of molded elongated modular planter or flower box section members 11 will sealingly compress and bulge the sealing member leg portion 35 of the sealing member 34 against the back wall portions 17b, 23b and 56c and outwardly within the cavities 17a, 23a and 56b of the coupling connectors 16, 22, and 55.

Note that the plurality of molded coupling connectors 16, 22, and 55 can be of different angular configurations and dimensions in lengths, widths and thicknesses. As illustrated in FIG. 1, the angular configurations of coupling connectors 16 and 22 have angles of 90° and 22°, respectively. Also, an angle of 180° is illustrated in FIGS. 4, 4A and 4B for the coupling connector 55.

A pair of fastening holes 14 being disposed in the double-walled female end portions of the coupling connectors 16, 22, and 55 to align with the at least a pair of fastening holes 14 in the U-shaped male end portions of the plurality of molded elongated modular planter or flower box section members 11. This alignment of the fastening holes 14 of the U-shaped male end portions 12a and 12b of the plurality of molded elongated modular planter or flower box section members 11 and the double-walled female end portions of the coupling connectors 16, 22, and 55 that receives a fastening member 21 to secure and sealingly tighten the plurality of molded elongated modular planter or flower box section members 11 in the coupling connectors 16, 22, and 55 together as a unit.

FIG. 1 further shows a pair of end caps 28 having a rear end with a pair of upstanding or vertical inner side walls 29f and outer side walls 29 and a lower bottom inner horizontal wall 29a interconnected to the pair of upstanding or vertical inner side walls 29 at the lower end thereof and a front end having a flat surface area with a top end 28a and a lower bottom outer wall end 29d. The lower bottom outer wall end 29d being interconnected to the pair of upstanding or vertical outer side walls 29. Also, the lower bottom outer wall end 29d includes a semi-circle or C-shaped area or member 29e extending integrally downward and centrally there from with a flow opening 30 disposed therein. The pair of upstanding or vertical inner side walls 29f and outer side walls 29, the lower bottom outer wall end 29d and the lower bottom inner horizontal wall defines a U-shaped double-walled cavity 29b formed therein on the rear end of the pair of end caps with a back or end wall portion 29c (shown in FIGS. 7, 7A, 7B, 7C and 7D) defining the depth of the U-shaped double-walled cavity 29b to receive the U-shaped male end portion 12b (shown in FIG. 2) of the plurality of molded elongated modular planter or flower box end section members 11 opposite the U-shaped male end portion 12a (shown in FIG. 2) of the U-shaped male end portions that are interconnected into the double-walled cavities 17a and 23a of the coupling connectors 16 and 22, respectively, for defining a complete continuous unit. Below the lower bottom wall of the U-shaped double-walled cavity 29b, a semi-circle or C-shaped female drain channel or cavity 29e (shown in FIGS. 7, 7A, 7B, 7C and 7D) extends integrally downward there from.

Note that the fastening member 21 can be selected from the group consisting of pins, such as, dowel pins, cotter pins, straight or tapered pins, split pins, threaded fasteners, such as, screws, screw and nuts, captive threaded fasteners, threaded inserts, threaded rods, screw anchors, anchor bolts, rivets, clips, pegs, clamps and clasps to name just a few. However, the preferred type of fastening member 21 will either be from the group consisting of pins or screws.

The end caps 28 includes a plurality of spaced fastening holes 14 to align with the spaced fastening holes in the upstanding or vertical inner side walls 12c and outer side walls 12 adjacent the opposite U-shaped male ends 12a and 12b, depending on which end the cap is disposed on of the U-shaped male end portions of the plurality of molded elongated modular planter or flower box end section members 11. A fastening member 21 is inserted through the aligned fastening holes to secure and seal the caps 28 to the opposite ends 12a and 12b of the U-shaped male end portions of the plurality of molded elongated modular planter or flower box end section members 11 to form a complete improved molded continuous leak-proof modular E-Z garden planter or flower box assembly unit 10. It is noted that the opposite ends 12a and 12b will abut a leg portion 35 of a sealing member 34 against a back wall portion 29c (see FIGS. 7, and 7A-7D for greater detail) of the end caps 28. The leg portion 35 will bulge outwardly within the double-walled cavity 29b to provide a non-leaking and effective sealing application between the sealing caps 28 and the U-shaped male ends 12a and 12b.

Also illustrated in FIG. 1, the end caps further include a threaded drain assembly 31 for draining or evacuating excess water from the improved molded continuous leak-proof modular E-Z garden planter or flower box assembly unit 10. Details of this threaded drain assembly 31 will be discussed in greater details in the following Figures.

The complete improved molded continuous leak-proof modular E-Z garden planter or flower box assembly unit 10 includes a plurality of bracket members 38, 44 and 49 for supporting and mounting it to or across a wall structure. The plurality of bracket members 38, 44 and 49 includes a single U-shaped bracket member 49, a double U-shaped bracket member 38 and U-shaped bracket member 44 with a J-shaped mounting arm or hook-like element 46-48 (shown in FIG. 2). Further details of these bracket members 38, 44, and 49 will be discussed in the upcoming Figures.

Figure 2:
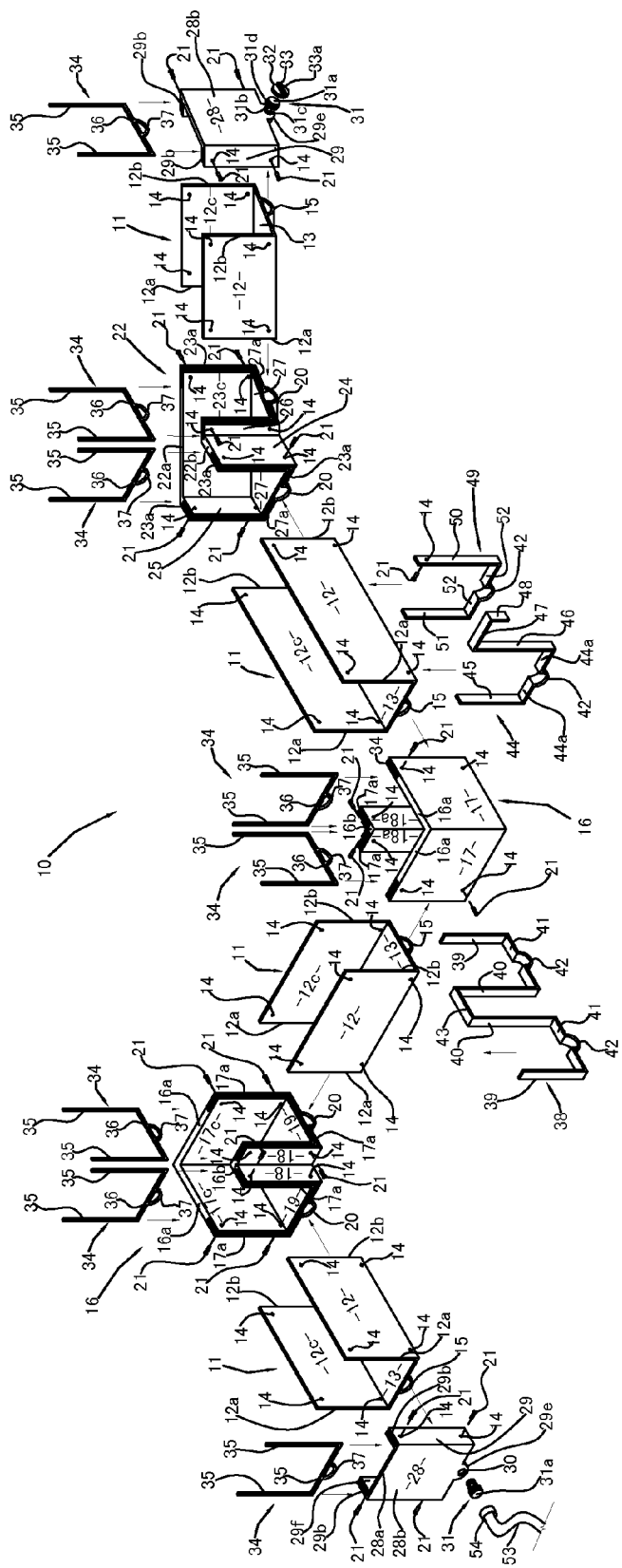
FIG. 2 illustrates an exploded perspective view of the molded continuous and modular E-Z garden planter or flower box assembly unit having a pair of double-walled end cap drain devices according to the present invention.

FIG. 2 illustrates an exploded perspective view of the molded continuous leak-proof modular E-Z garden planter or flower box assembly unit 10. In order to eliminate redundancy of the components previously described in the description of FIG. 1, only certain components will be discussed in referenced to FIG. 2. This Figure shows the improved U-shaped sealing member 34 with a pair of upstanding leg portions 35, a downward extending semi-circle or C-shaped portion or member 37, the male semi-circle or C-shaped drain channel 15 of the plurality of elongated planter or flower box section members 11, the female semi-circle or C-shaped drain channel 20 of the plurality of coupling connectors 16, 22 and 55 (shown in FIGS. 4, 4A and 4B) and the plurality of bracket members 38, 44 and 49.

The sealing relationship of the sealing member 34 with the male semi-circle or C-shaped drain channel 15 of the plurality of elongated planter or flower box section members 11 and the female semi-circle or C-shaped drain channel 20 of the plurality of coupling connectors 16, 22 and 55 will now be discussed.

As discussed above, when the sealing leg portions 35 of the sealing member 34 is inserted into the double-walled female end cavities 17a, 23a and 56b and is engaged by the U-shaped male ends 12a and 12b to compress and bulge the seal leg portions outwardly therein. At the same time, the downward extending semi-circle or C-shaped portion or member 37 of the seal member 34 is inserted in and tightly conforms to the semi-circle or C-shaped drain channel 20 of the plurality of coupling connectors 16, 22 and 55 to provide an effective and tight seal therein. Also, when the U-shaped male ends 12a and 12b are inserted into the double-walled female end cavities 17a, 23a and 56b, the male semi-circle or C-shaped drain channel 15 of the plurality of elongated planter or flower box section members 11 are inserted and tightly fitted within the female semi-circle or C-shaped drain channel 20 of the plurality of coupling connectors 16, 22 and 55 into a sealing and abutting engagement with the downward extending semi-circle or C-shaped portion or member 37 of the seal member 34 within the female semi-circle or C-shaped drain channel 20 of the plurality of coupling connectors 16, 22 and 55. This will eliminate any leakage between the coupling connectors 16, 22 and 55 and the plurality of elongated planter or flower box section members 11 and the plurality of male semi-circle or C-shaped drain channels 15.

It is to be recognized that the male semi-circle or C-shaped drain channel 15 of the plurality of elongated planter or flower box section members 11 has a first diameter that is slightly smaller than a second diameter of the female semi-circle or C-shaped drain channel 20 of the plurality of coupling connectors 16, 22 and 55. This allows the male semi-circle or C-shaped drain channels 15 to slide easily within the C-shaped drain channels 20 but yet in a tight-fitted sealing arrangement.

The aforementioned plurality of bracket members 38, 44 and 49 illustrated in FIG. 1 will now be discussed in greater detail as shown in FIG. 2.

As shown in FIG. 2, the double U-shaped bracket member 38 includes a pair of interconnected U-shaped bracket members 38 Each U-shaped bracket member 38 has a first short leg portion 39, a longer leg portion 40, a bottom horizontal leg portion 41 that is connected to a lower bottom end of each of the first short leg portions 39 and the longer leg portion 40. The bottom horizontal leg portion 41 includes a semi-circle or C-shaped cavity in a central portion thereof. A top horizontal leg portion 43 is connected to each of the long leg portions 40 to make the double U-shaped bracket member 38 a single unit. This interconnected top horizontal leg portion 43 is disposed across the top of a wall structure, so that the double U-shaped bracket member 38 can support a pair of molded continuous leak-proof modular E-Z garden planter or flower box assembly units 10 on opposite sides of a wall structure, such as a top wall of decks, patios, balconies, windows, porches, roof tops, fences, brick and/or concrete barrier walls, other building wall structures and any other elevated surfaces.

Also, a U-shaped bracket member with an L-shaped mounting arm or hook-like portion or element is represented by element 44. This U-shaped member 44 includes a short leg portion 45, a longer leg portion 46, and a bottom horizontal leg portion 44a that is connected to a lower bottom end of each U-shaped bracket member 38. The bottom horizontal leg portion 44a includes a semi-circle or C-shaped cavity 42 in a central portion thereof. An L-shaped mounting arm 47, 48 is connected to a top end of the longer leg portion 46 defining a J-shaped configuration. This L-shaped mounting arm 47, 48 is mounted and hung over a top portion of the wall structure or member 64 (shown in FIGS. 11 and 12) recited above.

A single U-shaped bracket member 49 includes a short leg portion 51, a longer leg portion 50 and a bottom horizontal leg portion 52 that is connected to a lower bottom end of each of the short leg portion 51 and the longer leg portion 50. The bottom horizontal leg portion 41 includes a semi-circle or C-shaped cavity in a central portion thereof. The longer leg portion 50 includes a fastening hole 14 disposed near a top end thereof. A fastening member 21, such as the one previously mentioned above is inserted through the fastening hole 14 to secure the bracket member 49 to at least one of the plurality of molded continuous leak-proof modular E-Z garden planter or flower box assembly units 10 through the fastening hole 14 at one of the ends thereof. The fastening member 21 is inserted from the inside, so that the fastening member 21 is flush and smooth with the fastening hole 14 on the exterior of the at least one of the U-shaped male ends of the plurality of molded continuous leak-proof modular E-Z garden planter or flower box assembly units 10.

The bracket members 38 and 44 as illustrated in FIG. 2 are not secured to the molded continuous leak-proof modular E-Z garden planter or flower box assembly units 10 by fastening members, such as element 21. However, a fastening member 21 could be utilized, if desired.

Further referring to FIG. 2, the semi-circle or C-shaped central cavities 42 of each of the bottom or horizontal leg members 41, 44a and 52 of bracket members 38, 44 and 49, respectively, supports and mounts the semi-circle or C-shaped drain channels 15 therein in a conformed manner for stabilizing the plurality of molded continuous leak-proof modular E-Z garden planter or flower box assembly units 10.

Finally, in FIG. 2, the end caps 28 include a drain adapter 31 disposed therein with a drain hose member 53, 54 that is removably attached thereto. Also, the adapters 31 of end caps 28 can have a protective cap 32 secured thereon (shown in FIGS. 7A and 7C). More details of the end caps 28, the drain adapter 31 and protective cap 32 will be discussed in the upcoming description of FIGS. 7 and 7A-7D.

Figure 3A:
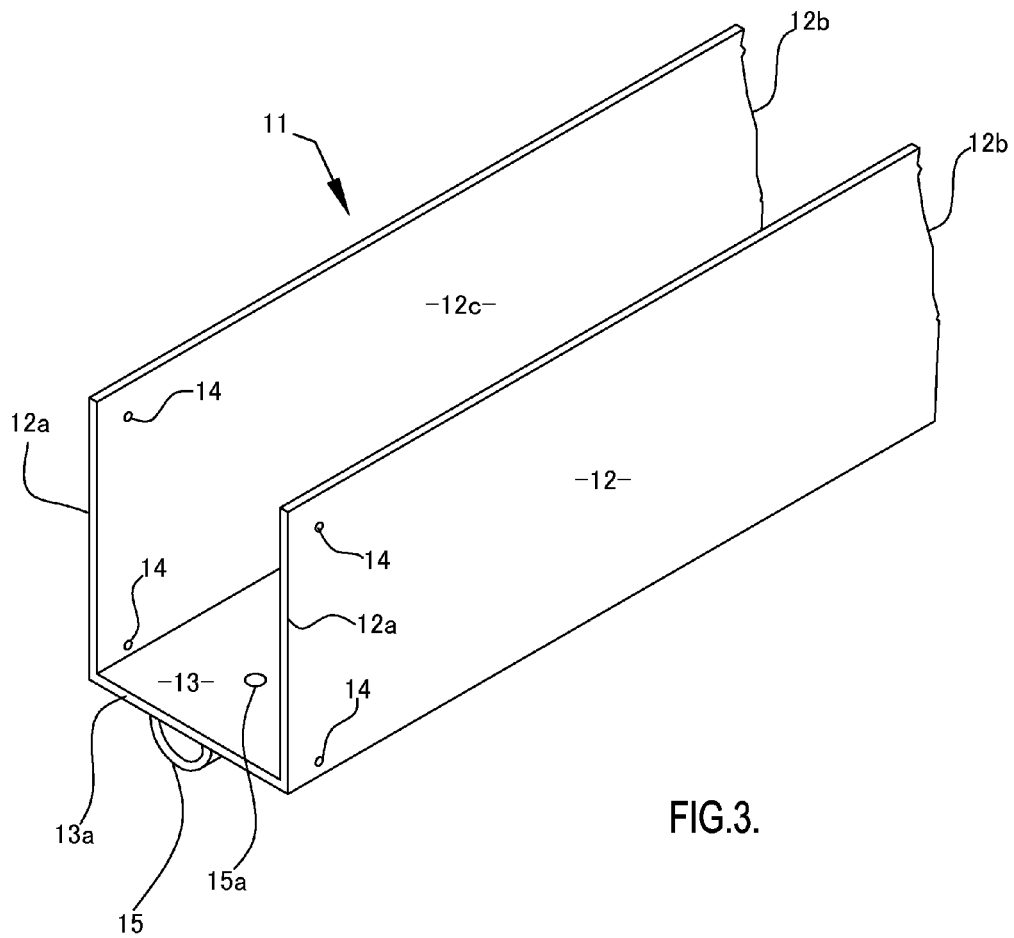
FIG. 3A illustrates a front perspective view of the molded elongated modular planter or flower box sectional unit with the semi-circle or C-shaped drain channel disposed below the bottom wall surface of the molded elongated modular planter or flower box sectional unit according to the present invention.
Figure 3A:
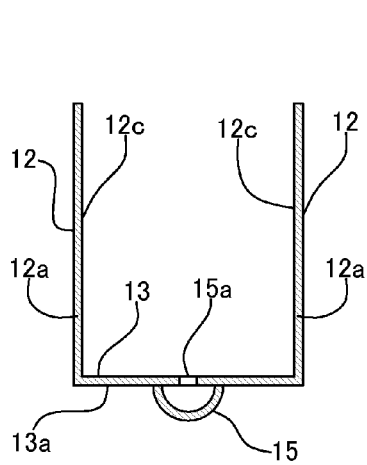

FIG. 3 illustrates a cut sectional isometric view of a single molded elongated and modular planter or flower box sectional unit 11 that includes a pair of interior and exterior upstanding or vertical side walls 12, U-shaped male ends 12a and 12b (represented by the cut section) with a plurality of spaced apart fastening holes 14 (only shown on one end) and a bottom horizontal wall portion 13 interconnected at a lower end of each of the interior upstanding or vertical side walls 12c to form a unitary structure. The bottom horizontal wall portion 13 further includes a plurality of spaced apart drain holes 15a therein, which communicates with a semi-circle or C-shaped drain channel 15 extending downward there from and along an entire length thereof to evacuate or drain excess water from the plurality of molded elongated and modular planter or flower box sectional unit assemblies 10 through the end caps 28 via the drain adapter 31 as discussed above.

FIG. 3A illustrates a front view of a single molded elongated and modular planter or flower box sectional unit 11 with the upstanding outer side walls 12 and the inner side walls 12c, interconnecting bottom and horizontal wall portion 13, an underneath surface 13a of the interconnecting bottom and horizontal wall portion 13 and a semi-circle or C-shaped drain channel 15 extending downward from underneath surface 13a of the interconnecting bottom and horizontal wall portion 13.

Figure 3B:
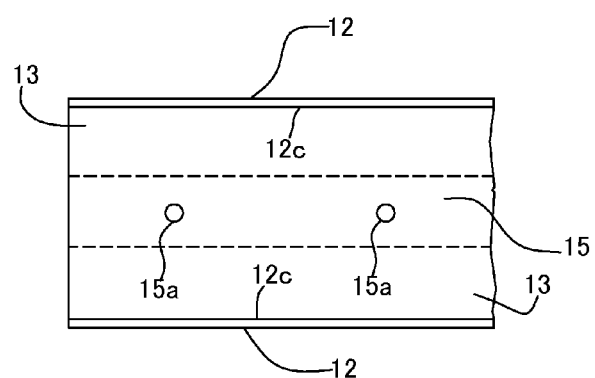
FIG. 3B illustrates a top perspective view of one of the molded elongated modular planter or flower box sectional unit with a plurality of spaced drain holes in the bottom wall surface that communicates with the semi-circle or C-shaped drain channel disposed below the bottom wall surface of the molded elongated modular planter or flower box sectional unit according to the present invention.

FIG. 3B illustrates a top cut sectional view of a single molded elongated and modular planter or flower box sectional unit 11 that shows the top of the outer side walls 12 and the inner side walls 12c, the spaced apart drain holes 15a in the interconnecting bottom and horizontal wall portion 13 and a semi-circle or C-shaped drain channel 15 extending downward from underneath surface 13a of the interconnecting bottom and horizontal wall portion 13 as shown in the dotted lines. It is to be noted that the distance between and number of the spaced apart drain holes 15a utilized will be determined by the selected dimensions of each molded elongated and modular planter or flower box sectional unit 11

FIG. 4 illustrates an exploded isometric view of a 180° molded coupling connector 55 and a sealing member 34 to be utilized therewith. The 180° molded coupling connector 55 includes a pair of upstanding or vertically extending inner side wall members 56d and outer side wall members 56 and a first lower inner horizontal wall member 57 that interconnects the pair of upstanding or vertically extending inner side wall members 56d at its lower end and a second lower outer horizontal wall member 56a that interconnects the pair of upstanding or vertically extending outer side wall members 56 to form the 180° molded coupling connector 55 into a U-shaped configuration.

Each end of the 180° U-shaped molded coupling connector 55 defines a U-shaped cavity 56b between the pair of upstanding or vertically extending inner side wall members 56d and outer side wall members 56 and the first lower inner horizontal wall member 57 and the second lower outer horizontal wall member 56a. The U-shaped cavity 56b has a selected depth defined by a common back wall portion 56c that acts as a stop for the seal member 34 when fully inserted into the pair of U-shaped cavities 56b. In addition, the second lower outer horizontal wall member 56a has a central portion defining a downward extending female semi-circle or C-shaped channel 15 that forms a part of the U-shaped cavities 56b. The downward extending semi-circle or C-shaped channel 15 extends along and below the entire bottom length of the first lower inner horizontal wall member 57.

Referring further to FIG. 4, the seal member 34 is shown in an exploded manner outward of the U-shaped cavity 56b. The seal member 34 includes a pair of upstanding or vertically extending side leg portions 35 and a bottom horizontal leg portion 36 that interconnects with the pair of upstanding or vertically extending side leg portions at its lower ends. The bottom leg portion 36 includes a central portion defining a downward extending male molded C-shaped or semi-circle shaped seal member portion 37 with an opening there through that extends downward there from and into alignment and sliding sealing engagement within the female drain channel 15 of the molded coupling connector 55. Note that the downward extending male molded C-shaped or semi-circle shaped seal member portion 37 will travel along the female drain channel 15 to a selected location therein, which is determined when the full insertion of the pair of upstanding or vertically extending side leg portions 35 of the seal member 34 abuts and stop against the common back wall portion 56c of the U-shaped cavity 56 of the molded coupling connector 55.

Also, the pair of upstanding or vertically extending inner side wall members 56d and outer side wall members 56 include a pair of spaced and aligned fastening holes 14 near the top and bottom ends thereof for receiving fastening members 21 there through when the U-shaped male ends 12a and 12b of the molded elongated modular planter or flower box sectional units 10 are secured within the U-shaped cavities 56b of the 180° molded coupling connector 55.

FIG. 4A illustrates a top perspective view of the 180° molded coupling connector with the inner upstanding or vertically side wall members 56d and outer upstanding or vertically side wall members 56 forming a double-wall female U-shaped cavities 56b at both ends, which is separated by the common back wall portion 56c. Also, in FIG. 4, each cavity 56b is shown with the sealing leg portions 35 being fully inserted therein and into abutting and sealing engagement with the common back wall portion 56c. In addition, the inner upstanding or vertically side wall members 56d and outer upstanding or vertically side wall members 56 shows a plurality of fastening holes disposed therein and forward of the sealing leg portions 35.

FIG. 4B illustrates a front perspective view of the 180° molded coupling connector with the inner and outer upstanding or vertically side wall members 56 forming the double-walled female U-shaped cavities 56b with the sealing member 34 being fully inserted therein.

In FIG. 4B, the 180° molded U-shaped coupling connector 55 shows the pair of upstanding or vertically extending inner and outer side wall members 56 and a first lower inner horizontal wall member 57 that interconnects the pair of upstanding or vertically extending inner side wall members 56d at its lower end and a second lower outer horizontal wall member 56a that interconnects the pair of upstanding or vertically extending outer side wall members 56. The 180° U-shaped molded coupling connector 55 defines a U-shaped cavity 56b between the a pair of upstanding or vertically extending inner side wall members 56d and outer side wall members 56, the first lower inner horizontal wall member 57 and the second lower outer horizontal wall member 56a. Also, the second lower outer horizontal wall member 56a has a central portion defining the downward extending female semi-circle or C-shaped channel 20 that forms a part of the U-shaped cavities 56b. The downward extending semi-circle or C-shaped channel 20 extends along and below the entire bottom length of the first lower inner horizontal wall member 57.

The seal member 34 is shown fully inserted in the U-shaped cavity 56b. The pair of upstanding or vertically extending side leg portions 35 and the bottom horizontal leg portion 36 interconnects with each other at its lower ends. The male molded C-shaped or semi-circle shaped seal member portion 37 with the opening there through is fully inserted into alignment and sliding sealing engagement within the female molded C-shaped or semi-circle shaped drain channel 20 of the molded coupling connector 55.

Figure 5:
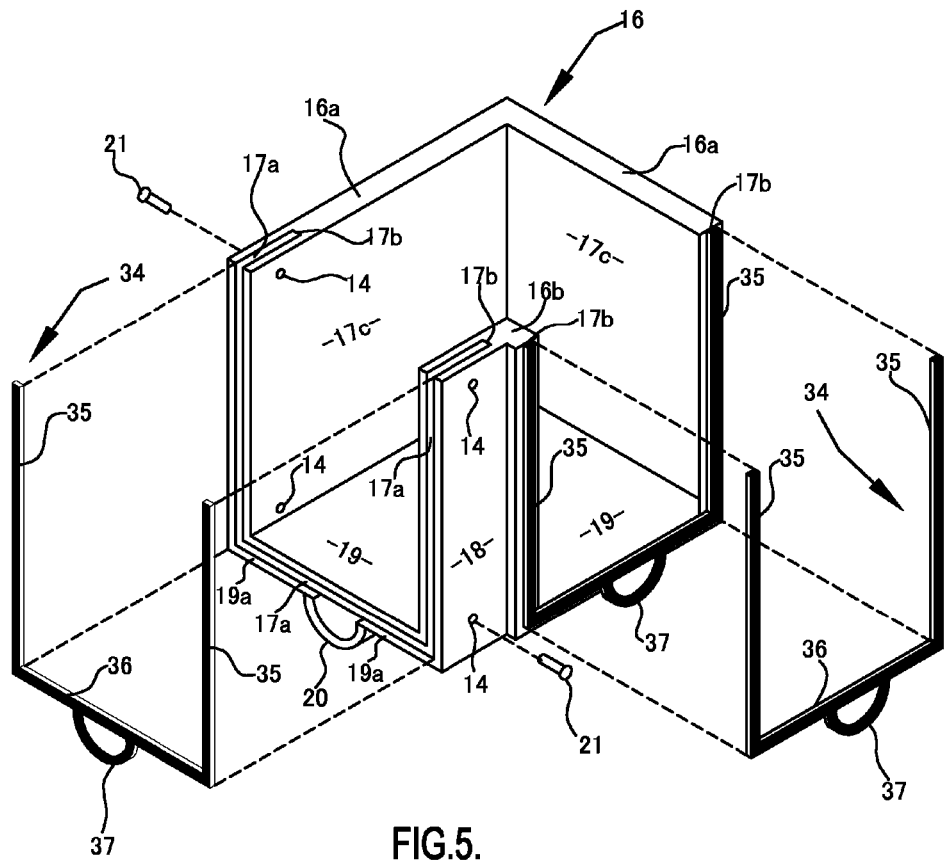
FIG. 5 illustrates an exploded and cut-sectional isometric view of a 90° coupling connector with double-walled ends and seal member assembly utilized in the molded continuous and modular E-Z garden planter assembly unit according to the present invention.

FIG. 5 illustrates an exploded and cut-sectional isometric view of a 90° molded coupling connector 16 with double-walled ends defining a U-shaped cavity 17a disposed there between and a sealing member assembly 34 to be received therein for providing an effective and non-leaking sealing arrangement between the plurality of U-shaped male ends 12a and 12b of the molded continuous and modular E-Z garden planter or flower box units 11 and the U-shaped cavities 17a.

The 90° molded coupling connector 16 includes a first pair of upstanding or vertically extending inner side wall members 17c and outer side wall members 17 having a first dimension and a second pair of upstanding or vertically extending inner side wall members 18a and outer side wall members 18 having a second dimension less than the first dimension that are connected to one another and defining a right angle. A first lower inner horizontal wall member 19 that interconnects the first pair of upstanding or vertically extending inner side wall members 17c and 18a at its lower end and a second lower outer horizontal wall member 19a that interconnects the pair of upstanding or vertically extending outer side wall members 17 and 18 to form the 90° molded coupling connector 16 into a U-shaped double-wall configuration. Each end of the 90° U-shaped molded coupling connector 16 defines a U-shaped double-wall cavity 17a between the pair of upstanding or vertically extending inner side wall members 17c and 18a and outer side wall members 17 and 18, the first lower inner horizontal wall member 19 and the second lower outer horizontal wall member 19a.

The U-shaped cavities 17a extend between the top surfaces 16a of the first pair of upstanding or vertically extending inner side wall members 17c and outer side wall members 17 and the top surface 16b of second pair of upstanding or vertically extending inner side wall members 18a and outer side wall members 18 and the second lower outer horizontal wall member 19a.

The U-shaped cavity 17a has a selected depth defined by a back wall portion 17b at the rear thereof that acts as a stop for the seal member 34 when fully inserted into the pair of U-shaped cavities 17a. In addition, the second lower outer horizontal wall member 19a has a central portion defining a downward extending female semi-circle or C-shaped channel 20 that forms a part of the U-shaped cavities 17a. The downward extending semi-circle or C-shaped channel 20 extends along and below the entire bottom length of the first lower inner horizontal wall member 19.

The 90° molded coupling connector 16 as shown in FIG. 5 shows a sealing member assembly 34 that is exploded outward of the cavity 17a on both ends. One of the ends also shows the sealing member assembly 34 being disposed in a cut section of the cavity 17a and being fully inserted against the back wall portion 17b thereof. The sealing member assembly 34 includes a pair of upstanding or vertically extending side leg portions 35 and a bottom horizontal leg portion 36 that interconnects with the pair of upstanding or vertically extending side leg portions at its lower ends. The bottom leg portion 36 includes a central portion defining a male molded C-shaped or semi-circle shaped seal member portion 37 with an opening there through that extends downward there from and into alignment and sliding sealing engagement within the female drain channel 20 of the 90° molded coupling connector 16.

Note that the male molded C-shaped or semi-circle shaped seal member portion 37 will travel along the female drain channel 20 to a selected location therein, which is determined when the full insertion of the pair of upstanding or vertically extending side leg portions 35 of the seal member assembly 34 abuts and stop against opposite back wall portions 17b of the U-shaped cavity 17a of the 90° molded coupling connector 16.

As shown in FIG. 5, the pair of upstanding or vertically extending inner and outer side wall members 17 include a pair of spaced and aligned fastening holes 14 near the top and bottom ends thereof for receiving fastening members 21 there through to compress the seal member assembly 34 within the cavities 17a to provide an effective and non-leaking seal relative to the U-shaped male ends 12a and 12b of the molded elongated modular planter or flower box sectional units 10 when inserted within the U-shaped cavities 17a of the 90° molded coupling connector 16.

Figure 5A:
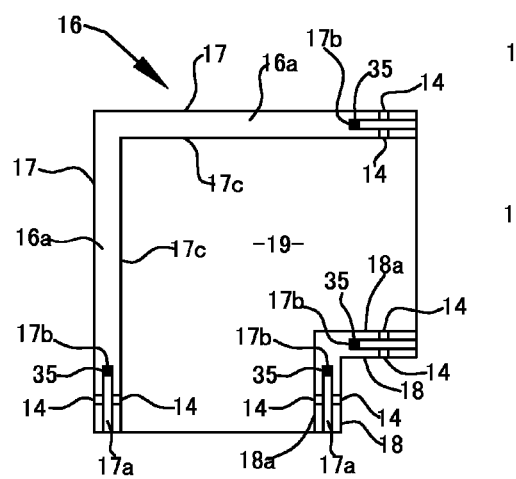
FIG. 5A illustrates a top perspective view of the 90° coupling connector with double-walled ends and seal member assembly utilized in the molded continuous and modular E-Z garden planter assembly unit according to the present invention.

FIG. 5A illustrates a top perspective view of the 90° coupling connector with double-walled ends defining a U-shaped cavity 17a there between to receive the seal member assembly 34 therein. However, only a top portion of leg portions 35 of the seal member assembly 34 is shown in an abutting and sealing relationship with the back wall portion 17*b* of each cavity 17*a*. Also, illustrated in FIG. 5A is the plurality of inner first dimensional side wall members 17*c* and outer first dimensional side wall members 17 with a top surface 16*a*, the plurality of inner second dimensional side wall members 18*a* and outer second dimensional side walls 18 with a top surface 16*b*, the first lower inner horizontal wall member 19 and the pair of aligned securing holes 14 as shown disposed near a top portion of the first dimensional side wall members 17 and 17*c* and second dimensional side walls and 18 and 18*a* on opposite sides of the U-shaped cavities 17*a*.

Figure 5B:
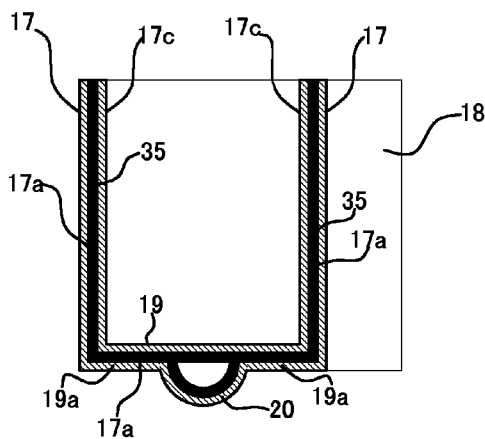
FIG. 5B illustrates a front perspective view of the 90° coupling connector with double-walled ends and seal member assembly utilized in the molded continuous and modular E-Z garden planter assembly unit according to the present invention.

In FIG. 5B, the 90° molded U-shaped coupling connector 16 shows the pair of upstanding or vertically extending first dimensional side wall members 17 and 17*c* and second dimensional side wall members 18 and 18*a*. A first lower inner horizontal wall member 19 interconnects the pair of upstanding or vertically extending first dimensional inner side wall members 17*c* and second dimensional inner side wall members 18*a* at its lower ends and the second lower outer horizontal wall member 19*a* interconnects the pair of upstanding or vertically extending first dimensional outer side walls 17 and second dimensional outer side wall members 18 at its lower ends. The first lower inner horizontal wall member 19 and the second lower outer horizontal wall member 19 being disposed at both ends of the U-shaped coupling connector 16.

The 90° U-shaped molded coupling connector 16 defines a U-shaped cavity 17*a* formed between the first dimensional inner side wall members 17*c*, the second dimensional inner side wall members 18*a* and the interconnecting first lower inner horizontal wall member 19 and the second dimensional outer side wall members 18, the first dimensional outer side wall members 17 and the interconnecting first lower inner horizontal wall member 19*a* at both ends of the U-shaped coupling connector 16.

Further in FIG. 5B, the second lower outer horizontal wall member 19*a* has a central portion defining the downward extending female semi-circle or C-shaped channel 20 that forms a portion of the U-shaped cavities 17*a*. The downward extending semi-circle or C-shaped channel 20 extends along and below the entire bottom length of the first lower inner horizontal wall member 19.

The aforementioned seal member assembly 34 is shown fully inserted into the U-shaped cavity 17*a*. The pair of upstanding or vertically extending side leg portions 35 and the bottom horizontal leg portion 36 of the aforementioned seal member assembly 34 interconnects with each other at its lower ends. The male molded C-shaped or semi-circle shaped seal member 37 of the aforementioned seal member assembly 34 with the opening there through is fully inserted into alignment and sliding sealing engagement within the female molded C-shaped or semi-circle shaped drain channel 20 of the molded coupling connector 16.

Figure 6:
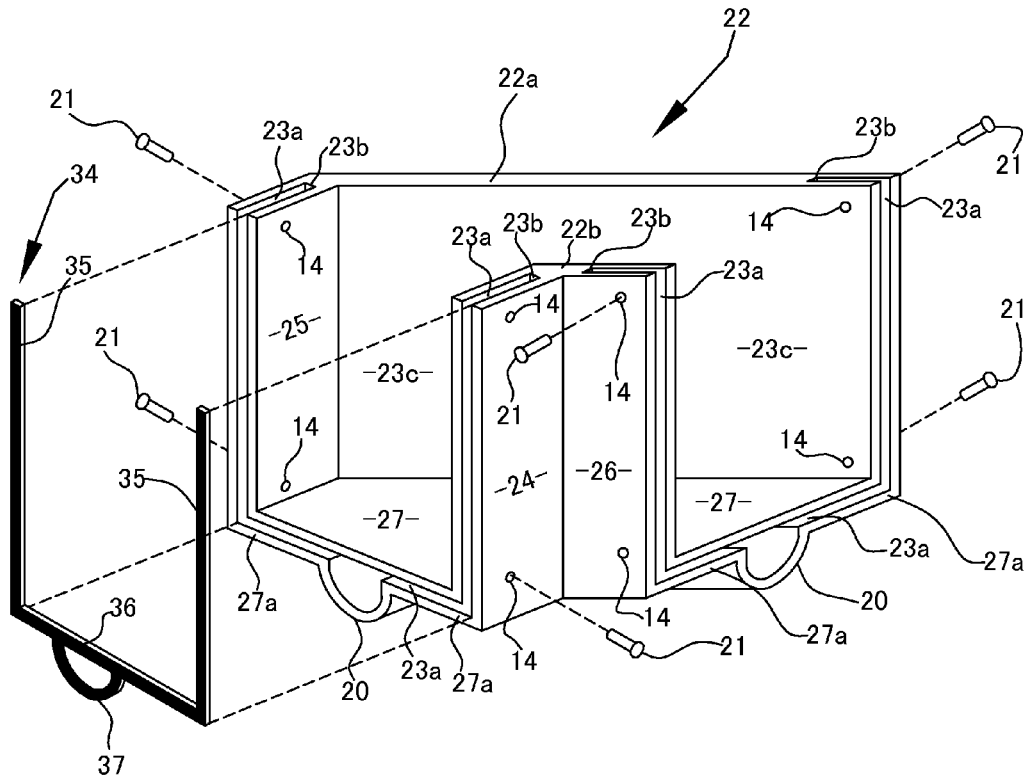
FIG. 6 illustrates an exploded isometric view of a 22° coupling connector with double-walled ends and seal member assembly utilized in the molded continuous and modular E-Z garden planter assembly unit according to the present invention.

FIG. 6 illustrates an exploded and cut-sectional isometric view of a 22° molded coupling connector 22 with double-wall ends defining a U-shaped double-wall cavity 23*a* disposed there between and a sealing member assembly 34 to be received therein for providing an effective and non-leaking sealing arrangement between the plurality of U-shaped male ends 12*a* and 12*b* of the molded continuous and modular E-Z garden planter or flower box units 11 and the U-shaped cavities 23*a*. As illustrated, the sealing member assembly 34 is positioned outward of the U-shaped cavity 23*a* so that all elements thereof can be shown.

Further, the 22° molded coupling connector 22 includes a first pair of upstanding or vertically extending first dimensional inner and outer side wall members 23*c* and 23, a plurality of second dimensional inner side wall members 25 and 26*a* and a plurality of second dimensional outer side wall members 24 and 26 being connected to one another that forms a 22° angle.

A first lower inner horizontal wall member 27 extending between both ends of the 22° molded coupling connector 22 that interconnects the upstanding or vertically extending first dimensional inner side wall member 23*c* and one of the plurality of second dimensional outer side wall members 25 on a first side thereof and a pair of the plurality of second dimensional inner side wall members 25 and 26*a* on a second side at its lower ends.

A second lower outer horizontal wall member 27*a* extending between both ends of the 22° molded coupling connector 22 that interconnects the upstanding or vertically extending first dimensional outer side wall member 23 and one of the plurality of second dimensional outer side wall members 26*a* at one of the double-wall ends of the 22° molded coupling connector 22 at its lower ends a pair of the plurality of second dimensional outer side wall members 24 on opposite sides to one another at the other double-wall end of the 22° molded coupling connector 22 and being interconnected with one another by the second lower outer horizontal wall member 27*a* at its lower ends.

The plurality of second dimensional inner side walls 25 and 26*a* and the second dimensional outer side walls 24 and 26 are connected to one another defining one side of the 22° molded coupling connector 22 and the first dimensional outer side wall member 23 and the second inner side wall member 25 and the outer side wall members 24 are connected to one another defining the other side of the 22° molded coupling connector 22 that forms the 22° angle.

The U-shaped cavities 23*a* extend a selected distance between the top surfaces 22*a* of the upstanding or vertically extending second dimensional inner side wall 25, the second dimensional outer side wall 24, the upstanding or vertically extending first dimensional outer side wall member 23 and the upstanding or vertically extending first dimensional inner side wall member 23*c* and the top surface 22*b* of the second pair of upstanding or vertically extending second dimensional inner side wall members 25 and 26*a* and outer side wall members 24 and 26 downward to the second lower outer horizontal wall member 27*a* at both ends thereof.

Further, the U-shaped cavity 23*a* has a selected depth within the upstanding or vertically extending inner and outer side wall members 23-26 at the ends thereof defined by a back wall portion 23*b* at the rear of the U-shaped cavities 23*a* that acts as a stop for the seal member 34 when fully inserted into the pair of U-shaped cavities 23*a*. In addition, the second lower outer horizontal wall member 27*a* has a central portion defining a downward extending female semi-circle or C-shaped channel 20 that forms a part of the U-shaped cavities 23*a*. The downward extending semi-circle or C-shaped channel 20 extends along the entire length of the second lower outer horizontal wall member 27*a* and below and along the entire length of the first lower inner horizontal wall member 27.

The 22° molded coupling connector 22 as shown in FIG. 6 shows a sealing member assembly 34 that is exploded outward of the cavity 23*a* at one of the ends. The sealing member assembly 34 includes a pair of upstanding or vertically extending side leg portions 35 and a bottom horizontal leg portion 36 that interconnects with the pair of upstanding or vertically extending side leg portions at its lower ends. The bottom leg portion 36 includes a central portion defining a male molded C-shaped or semi-circle shaped seal member 37 with an opening there through that extends downward there from and into alignment and sliding sealing engagement within the female drain channel 20 of the 22° molded coupling connector 22.

Note that the male molded C-shaped or semi-circle shaped seal member 37 will travel along the female drain channel 20 to a selected location therein, which is determined when the full insertion of the pair of upstanding or vertically extending side leg portions 35 of the seal member assembly 34 abuts and stop against opposite back wall portions 23b of the U-shaped cavity 23a of the 22° molded coupling connector 22.

Also shown in FIG. 6, the pair of upstanding or vertically extending inner and outer side wall members 23-26 include a pair of spaced and aligned fastening holes 14 near the top and bottom ends thereof for receiving fastening members 21 there through to compress the seal member assembly 34 within the cavities 23a to provide an effective and non-leaking seal relative to the U-shaped male ends 12a and 12b of the molded elongated modular planter or flower box sectional units 10 when inserted within the U-shaped cavities 23a of the 22° molded coupling connector 22.

Figure 6A:
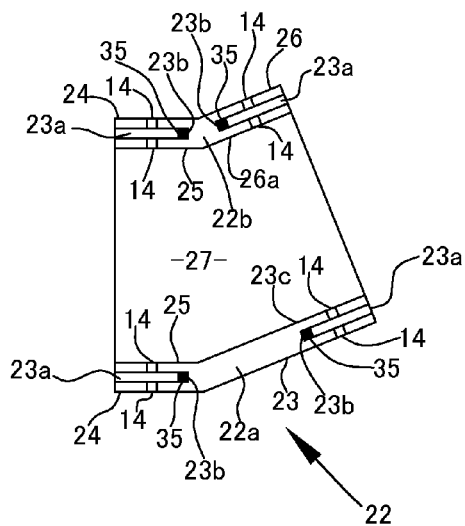
FIG. 6A illustrates a top perspective view of the 22° coupling connector with double-walled ends and seal member assembly utilized in the molded continuous and modular E-Z garden planter assembly unit according to the present invention.

FIG. 6A illustrates a top perspective view of the 22° coupling connector 22 with the double-wall ends defining the U-shaped cavities 23a therein to receive a seal member assembly 34 therein. However, only a top portion of leg portions 35 of the seal member assembly 34 is shown in an abutting and sealing relationship with the back wall portion 23b of each cavity 23a. Also, illustrated in FIG. 6A, a surface 22a is disposed at the top of the pair of the upstanding or vertical extending first dimensional outer and inner side wall members 23 and 23c and a pair of the plurality of second dimensional outer and inner side wall members 24 and 25 and extending to the double-wall ends on one side thereof. The other side of the 22° coupling connector 22 has a surface 22b at the top of the plurality of second dimensional inner side wall members 25 and 26a and the second dimensional outer side wall members 24 and 26 and extending to the double-wall ends on the other side thereof. Further, the first lower inner horizontal wall member 27 shown interconnected between the first dimensional inner side wall member 23c and the plurality of second dimensional inner side wall members 25 and 26a and the pair of aligned securing holes 14 are shown disposed near a top portion of the first and second dimensional side wall members 23-26 on opposite sides of the U-shaped cavities 23a.

Figure 6B:
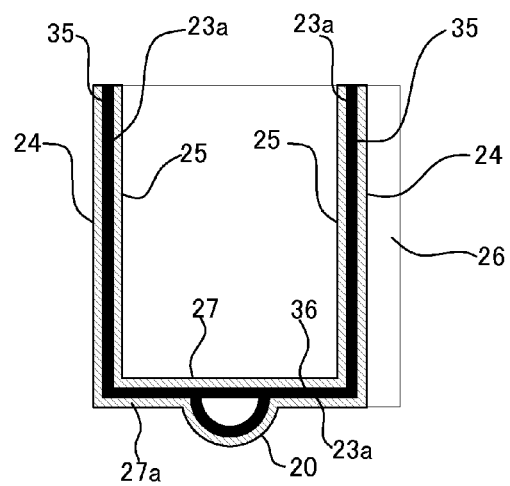
FIG. 6B illustrates a front perspective view of the 22° coupling connector with double-walled ends and seal member assembly utilized in the molded continuous and modular E-Z garden planter assembly unit according to the present invention.

In FIG. 6B, a front view of the 22° molded U-shaped coupling connector 22 at the left end thereof, shows the pair of upstanding or vertically extending inner and outer side wall members 24-26. A first lower inner horizontal wall member 27, as shown, interconnects the pair of upstanding or vertically extending second dimensional inner side wall members 25 and at its lower ends and the second lower outer horizontal wall members 27a interconnects the pair of upstanding or vertically extending second dimensional outer side wall members 24 and the adjoining second dimensional outer side wall member 26.

The 22° U-shaped molded coupling connector 22 shows the U-shaped cavity 23a being formed between the pair of upstanding or vertically extending first dimensional inner side wall member 23c and the first dimensional outer side wall member 23 on one side thereof at one end of the 22° U-shaped molded coupling connector 22 and between a pair of the plurality of second dimensional outer and inner side wall members 26 and 26a at the other side thereof at the other end of the 22° U-shaped molded coupling connector 22 and the interconnected first lower inner horizontal wall member 27 and the second lower outer horizontal wall member 27a. Also, at the other end of the 22° U-shaped molded coupling connector 22 shows the other U-shaped cavity 23a being formed between the plurality of second dimensional side wall members 24 and 25 on opposite sides thereof and the interconnected first lower inner horizontal wall member 27 the second lower outer horizontal wall member 27a.

Further in FIG. 6B, the second lower outer horizontal wall member 27a includes a central portion that defines a downward extending female semi-circle or C-shaped channel 20 that forms an integral portion of the U-shaped cavities 23a. The downward extending semi-circle or C-shaped channel 20 extends below and along the entire length of the bottom of the first lower inner horizontal wall member 27 between both ends of the 22° U-shaped molded coupling connector 22.

The aforementioned seal member assembly 34 as shown in a front view is fully inserted into the U-shaped cavity 23a. The pair of upstanding or vertically extending side leg portions 35 and the bottom horizontal leg portion 36 of the aforementioned seal member assembly 34 interconnects with each other at its lower ends are shown to be fully inserted in the U-shaped cavity 23a. The male molded C-shaped or semi-circle shaped seal member 37 of the aforementioned seal member assembly 34 with the opening there through is also shown to be fully inserted into alignment and sliding sealing engagement within the female molded C-shaped or semi-circle shaped drain channel 20 of the molded coupling connector 22 to provide an effective and non-leaking sealing arrangement therein.

Figures 7, 7A:
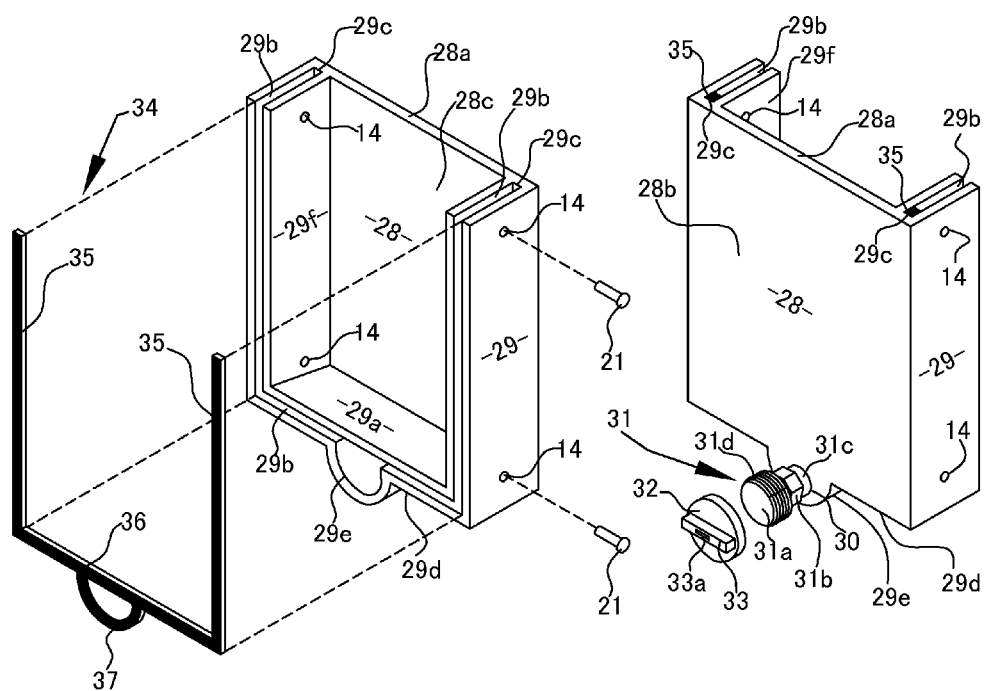
FIG. 7 illustrates an exploded rear isometric view of a double-walled end cap and seal member assembly utilized in the molded continuous and modular E-Z garden planter assembly unit according to the present invention.
FIG. 7A illustrates a front isometric view of the double-walled end cap and seal member assembly with a drain hose adapter and cap member utilized in the molded continuous and modular E-Z garden planter assembly unit according to the present invention.

FIG. 7 illustrates an exploded rear isometric view of an end cap 28 with U-shaped double-walled ends with a seal member assembly 34 to be received in a U-shaped cavity 29b at a rear end thereof. The seal member assembly 34 is shown exploded outward from the U-shaped cavity 29b. The end cap 28 includes a common top wall 28a of a front wall face or surface 28b (see FIG. 7A) and a rear wall face or surface 28c, a front pair of upstanding or vertically extending inner side walls 29f at opposite sides thereof, a lower bottom inner wall 29a that interconnects the plurality of upstanding or vertically extending inner side walls 29f, a pair of upstanding or vertically extending outer side walls 29 at opposite side thereof, a lower bottom outer wall 29d that interconnects the plurality of upstanding or vertically extending outer side walls 29 and the common top wall 28a of the front wall face or surface 28b (see FIG. 7A) and the rear wall face or surface 28c interconnects the pair of upstanding or vertically extending inner side walls 29f and outer side walls 29 to form a single molded cap unit 28. The U-shaped cavity will be discussed in greater details below.

The pair of upstanding or vertically extending inner side walls 29f outer side walls 29 further includes at least a pair of spaced apart and aligned fastening holes 14 that receives at least a pair of fastening members 21 that will be received there through to secure the male ends 12a and 12b of the molded continuous and modular E-Z garden planter assembly units 11 within the U-shaped cavity 29b and compressing the seal assembly unit 34 therein and within the female semi-circle or C-shaped channel 29e when the male semi-circle or C-shaped channel 15 of the male ends 12a and 12b of the molded continuous and modular E-Z garden planter assembly units 11 are fully inserted into the female semi-circle or C-shaped channel 29e of the end cap 28.

Also in FIG. 7, the U-shaped cavity 29b extends from an end of the pair of upstanding or vertically extending inner side walls 29f and outer side walls 29 to a selected depth therein to a location near the ends of the inner side walls 29f and outer side walls 29 that interconnects with the rear wall face or surface 28c that defines a back wall portion 29c that at least equals the height of the inner side walls 29f and outer side walls 29. The lower bottom outer wall 29d forms the bottom boundary wall of the U-shaped cavity 29b. This bottom outer wall 29d has a central downward extending portion that has a semi-circle or C-shaped configuration forming a channel portion 29e. It is to be noted the channel portion 29e extends along the entire length of the bottom boundary wall of the U-shaped cavity 29b below the bottom inner wall 29a to the back wall portion 29c extending between the top surface wall 28a and the bottom end wall portion that interconnects with the bottom inner and outer lower walls 29a and 29d.

In FIG. 7A, a front isometric view of the end cap 28 with the U-shaped double-wall ends with the seal member assembly 34 disposed within the U-shaped cavity 29b. From this front isometric view only the top portion of the U-shaped upstanding leg portions 35 can be seen in abutting engagement with the back wall portion 29c of the U-shaped cavity 29b. FIG. 7A further includes a front wall face or surface 28b extending between the top wall surface 28a and the lower bottom outer wall 29d. The front wall face or surface 28b has a lower central wall portion with a downward extending surface of the semi-circle or C-shaped channel portion 29e that extends from the lower bottom outer wall 29d, which conforms to the opposite side of the semi-circle or C-shaped channel portion 29e. The lower central wall portion downward extending surface of the front wall surface 28b has a central threaded opening 30 that extends there through and in flow communication with the semi-circle or C-shaped channel portion 29e.

The end cap 28 further includes a drain adapter 31 having a first front threaded end surface 31d of a first dimension on a front end, a second rear threaded end surface 31e of a second dimension being smaller than the first dimension, a nut member 31b being positioned behind the first front threaded surface 31d, a solid stop member 31c being disposed between the second rear threaded surface 31e and the nut member 31b and a drain opening 31a that extends through the drain adapter from the first front threaded end surface 31d to the second rear threaded end surface 31e.

Further in view of the drain adapter 31, the nut member 31b is a little larger than the first front threaded end surface 31d (see FIG. 7D) so that a tool means or a user's hand can easily grasp an outer surface of the nut member 31b to easily thread the drain adapter 31 into and out of the central threaded opening 30. When the drain adapter 31 is threaded into the central threaded opening 30 and the solid stop member 31c abuts up against the downward extending central wall portion of the front wall face or surface 28b, such will give a user an indication that the drain adapter 31 has been fully inserted and tightened to the required degree within the central threaded opening 30. This eliminates over tightening and the damaging of the threads 31e and the threaded opening 30, as well as providing an effective threaded sealing arrangement to prevent leakage. Note that a small seal washer (not shown) could be provide between the stop 31c and the downward extending central wall portion of the front wall face or surface 28b, if desired. In addition, the threads in the opening 30 and the second rear threaded end surface 31e could have a sealing material there about to provide an effective seal. Preferably the PVC or plastic material that the drain adapter 31 is made out of will provide the necessary sealing capabilities that will prevent leakage.

Also, in FIG. 7A, the threaded drain adapter 31 further includes a protective drain cap 32, with a handle member 33 on a front face of the drain cap 32 to allow a user or different types of tool means to easily grasp in order for the drain cap to be easily threaded on or unthreaded from the first front threaded end surface 31d and a tool aperture 33a for allowing the different types of tool means to be inserted therein so that the drain cap can be easily threaded on or unthreaded from the first front threaded end surface 31d. The back end of the drain cap 32 having an inner threaded portion (not shown) for threading about the first front threaded end surface 31d. Note that the back end of the drain cap 32 will abut against the drain adapter nut member 31b giving a user an indication that the cap is fully engaged and tightened to required degree, which will eliminate over tightening and the damaging of the first front threaded end surface 31d and the back end inner threaded portion of the drain cap 32.

Finally, FIG. 7A shows at least a pair of spaced apart and aligned fastening holes 14 in the pair of upstanding or vertically extending inner side walls 29f and outer side walls 29 that will receives at least a pair of fastening members 21 that will be received there through to secure the male ends 12a and 12b of the molded continuous and modular E-Z garden planter assembly units 11 within the U-shaped cavity 29b and compressing the seal assembly unit 34 therein and within the female semi-circle or C-shaped channel 29e when the male semi-circle or C-shaped channel 15 of the male ends 12a and 12b of the molded continuous and modular E-Z garden planter assembly units 11 are fully inserted into the female semi-circle or C-shaped channel 29e of the end cap 28, as previously stated in FIG. 7 above.

Figure 7B:
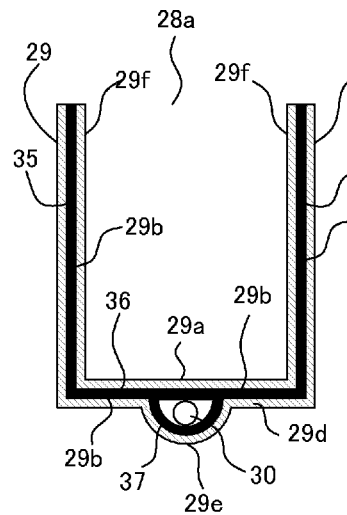
FIG. 7B illustrates a rear perspective view of the double-walled end cap and seal member assembly with a female drain channel utilized in the molded continuous and modular E-Z garden planter assembly unit according to the present invention.

In FIG. 7B, the end cap 28 shows the pair of upstanding or vertically extending inner side walls 29f and outer side walls 29. A first lower inner horizontal wall member 29a interconnects the pair of upstanding or vertically extending inner side walls 29f at its lower ends, a second lower outer horizontal wall member 29d interconnects the pair of upstanding or vertically extending outer side walls 29 and a top wall surface 28a interconnecting the pair of upstanding or vertically extending inner side walls 29f and outer side walls 29.

The end cap 28 defines a U-shaped cavity 29b formed between the pair of upstanding or vertically extending inner side walls 29f and outer side walls 29 that are interconnected by the first lower inner horizontal wall member 29a and the second lower outer horizontal wall member 29d at their lower ends thereof.

Further in FIG. 7B, the second lower outer horizontal wall member 29d has a central portion defining the downward extending female semi-circle or C-shaped channel 20 that forms a portion of the U-shaped cavities 29b. The downward extending semi-circle or C-shaped channel 29e extends along and below the entire bottom length of the first lower inner horizontal wall member 29a for receiving a portion of the seal assembly 34, which is discussed in greater details below.

The aforementioned seal member assembly 34 is shown fully inserted into the U-shaped cavity 29ba. The pair of upstanding or vertically extending side leg portions 35 and the bottom horizontal leg portion 36 of the aforementioned seal member assembly 34 interconnects with each other at its lower ends. The male molded C-shaped or semi-circle shaped seal member 37 of the aforementioned seal member assembly 34 with the opening there through is fully inserted into alignment and sliding sealing engagement within the female molded C-shaped or semi-circle shaped drain channel 29e of the end cap 28.

Figure 7C:
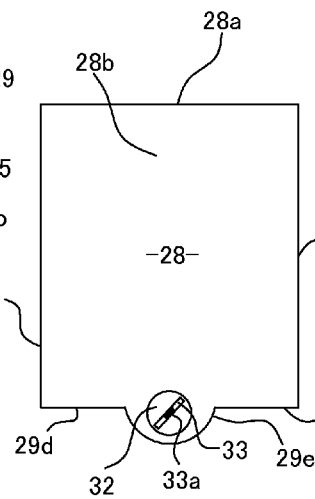
FIG. 7C illustrates a front perspective view of the double-walled end cap and seal member assembly with the drain hose adapter and cap member utilized in the molded continuous and modular E-Z garden planter assembly unit according to the present invention.

FIG. 7C illustrates a front perspective view of the double-wall end cap 28 with the pair of upstanding or vertically extending outer side walls 29 disposed on opposite sides thereof, a lower bottom outer wall 29d that interconnects the plurality of upstanding or vertically extending outer side walls 29 and a top wall surface 28a that interconnects the plurality of upstanding or vertically extending outer side walls 29 and the lower bottom wall 29d includes the downward extending central wall portion of the front wall surface 28b of the drain cap 32. A front view of the drain cap 28 shows the handle member 33 with the tool aperture 33a disposed therein. See FIG. 7A above for a more detailed description of what is shown in FIG. 7C.

Figure 7D:
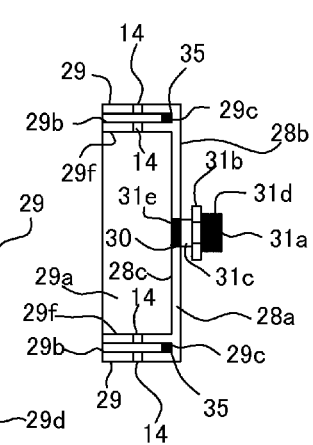
FIG. 7D illustrates a top perspective view of the double-walled end cap and seal member assembly with the drain hose adapter utilized in the molded continuous and modular E-Z garden planter assembly unit according to the present invention.

FIG. 7D illustrates a top perspective view of the double-walled end cap 28 having a U-shaped cavity 29b that includes a seal member assembly 34 and the drain hose adapter 31 to be utilized in the molded continuous and modular E-Z garden planter assembly units 11 according to the present invention.

Further in FIG. 7D, the top perspective view shows the pair of upstanding or vertically extending inner side walls 29f and outer side walls 29 with the aforementioned U-shaped cavity 29b being disposed there between at the rear end of the end cap 28. This U-shaped cavity shows the top portion of the U-shaped upstanding leg portions 35 of the seal member assembly 34. The depth of the U-shaped cavity extends from the rear end of the end cap 28 to a cavity back wall portion 29c adjacent the back wall portion 28c of the end cap 28 that the U-shaped upstanding leg portions 35 of the seal member assembly 34 will engage in an abutting engagement relationship there with. Also, the top wall surface 28a is shown as being interconnected with the pair of upstanding or vertically extending inner side walls 29f and outer side walls 29 at the top end thereof and the lower bottom wall 29a is shown as being interconnected with the pair of upstanding or vertically extending inner side walls 29f. Note that the lower bottom wall 29d that interconnects the pair of upstanding or vertically extending outer side walls 29 are not shown. In addition, the pair of upstanding or vertically extending inner side walls 29f and outer side walls 29 shows a pair of spaced and aligned fastening holes 14 for the aforementioned fastening members 21 as shown in FIG. 7 and discussed above.

Also in FIG. 7D, the drain adapter 31 is shown to be screw threaded within the threaded opening 30. The drain adapter 31 as previously discussed in FIG. 7A above has a larger front first threaded end portion 31d and a second rear smaller threaded end portion 31e that is threaded into the threaded opening 30. A threaded opening 31a extends entirely through the drain adapter 31 between the first threaded end portion 31d and the second rear smaller threaded end portion 31e that communicates with the female semi-circle or C-shaped drain channel 29e of the end cap 28. Inward of the larger front first threaded end portion 31d is a nut member 31b that either allows a user to grasp or receive a tool means to removably attach the adapter 31 to the second rear smaller threaded end portion 31e and disposed between the nut member 31b and the rear smaller threaded end portion 31e is a solid stop member 31c that acts as stop member when the adapter 31 is fully inserted within the rear smaller threaded end portion 31e.

It is to be noted that when the drain adapter 31 is threaded into the central threaded opening 30 and the solid stop member 31c abuts up against the downward extending central wall portion of the front wall face or surface 28b, this will give a user an indication that the drain adapter 31 has been fully inserted and tightened to the required degree within the central threaded opening 30. This eliminates any over tightening and the damaging of the threads 31e and the threaded opening 30, as well as providing an effective threaded sealing arrangement to prevent leakage. Note that a drain hose 53 and 54 is to be connected to the drain adapter 31 to drain or evacuate excess water from the molded continuous and modular E-Z garden planter assembly unit 10 to a desired location.

Figure 8:
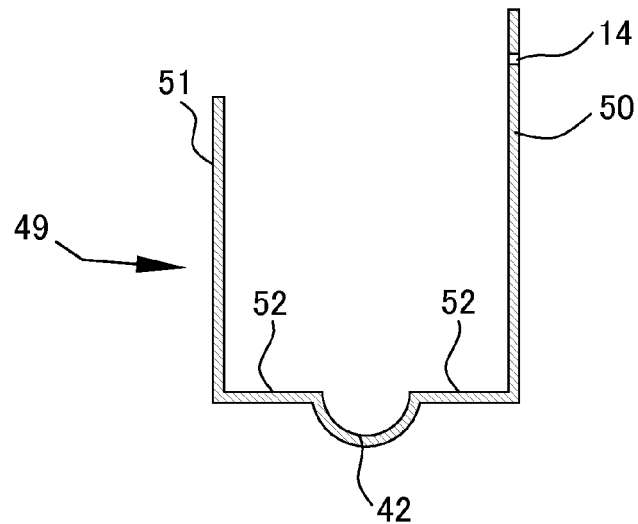
FIG. 8 illustrates a front perspective view of a U-shaped support bracket having a pair of upstanding leg portions with a fastening hole in the leg portion of greater length and a bottom horizontal interconnecting leg portion including a downward semi-circle or C-shaped area for supporting and conforming to the drain channels of the molded elongated modular planter or flower box sectional unit according to the present invention.

FIG. 8 illustrates a front perspective view of a single U-shaped support bracket 49 having a pair of upstanding leg portions 50 and 51 with a fastening hole 14 in the leg portion 50 that is of greater length than the leg portion 51 and a bottom horizontal interconnecting leg portion 52 including a downward semi-circle or C-shaped area 42 for supporting and conforming to the drain channels 15 of the molded elongated modular planter or flower box sectional units 11 for stabilization purpose.

Figure 8A:
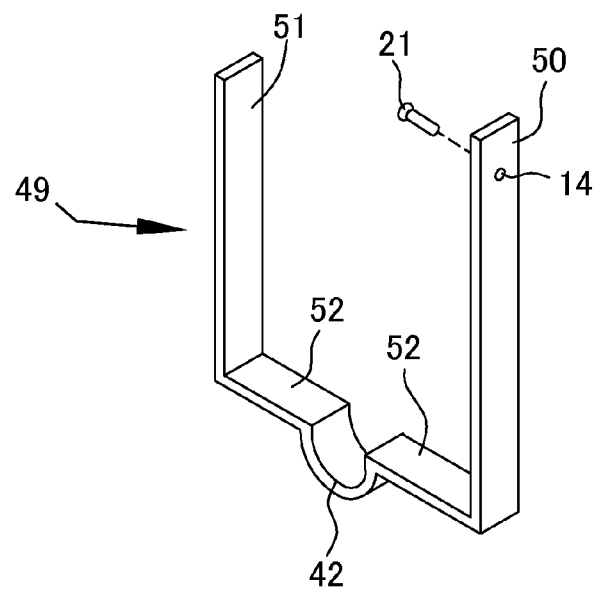
FIG. 8A illustrates an isometric view of the U-shaped support bracket with the pair of upstanding leg portions with the fastening hole in the leg portion of greater length to receive a fastening member therein and a bottom horizontal interconnecting leg portion including a downward semi-circle or C-shaped area for supporting and conforming to the drain channels of the molded elongated modular planter or flower box sectional unit according to the present invention.

FIG. 8A illustrates an isometric view of the single U-shaped support bracket 49 that includes a short leg portion 51, a longer leg portion 50 and a bottom horizontal leg portion 52 that is connected to a lower bottom end of each of the short leg portion 51 and the longer leg portion 50. The bottom horizontal leg portion 41 includes a semi-circle or C-shaped cavity in a central portion thereof. The longer leg portion 50 includes a fastening hole 14 disposed near a top end thereof. The downward semi-circle or C-shaped area 42 is utilized for supporting and conforming to the drain channels 15 of the molded elongated modular planter or flower box sectional units 11 for stabilization purpose.

Also, in FIG. 8A, the aforementioned fastening member 21 is inserted through the fastening hole 14 to secure the bracket member 49 to at least one side of the plurality of molded continuous leak-proof modular E-Z garden planter or flower box assembly units 11 through the fastening hole 14 at one of the top ends thereof. The fastening member 21 is inserted from the inside, so that the fastening member 21 is flush and smooth with the fastening hole 14 on the exterior of the at least one of the U-shaped male ends of the plurality of molded continuous leak-proof modular E-Z garden planter or flower box assembly units 11.

Figure 9:
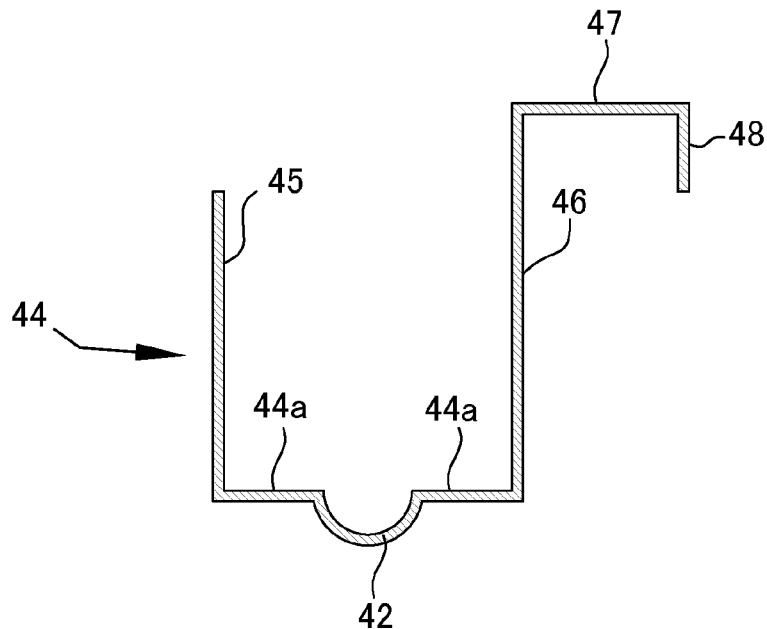
FIG. 9 illustrates a front perspective view of a U-shaped support bracket having a pair of upstanding leg portions with one of the leg portions being of greater length including an L-shaped or hook-like member to be hung and supported across a top surface of a wall member and a bottom horizontal interconnecting leg portion including a downward semi-circle or C-shaped area for supporting and conforming to the drain channels of the molded elongated modular planter or flower box sectional unit according to the present invention.

FIG. 9 illustrates an isometric front perspective view of a U-shaped support bracket 44 having a pair of upstanding leg portions 45 and 46 with one of the leg portions 46 being of greater length including an L-shaped or hook-like member 47 and 48 to be hung and supported across a top surface of the wall member or structure 64 (shown in FIGS. 11 and 12) and a bottom horizontal interconnecting leg portion 44a including a downward semi-circle or C-shaped area 42 for supporting and conforming to the drain channels 15 of the molded elongated modular planter or flower box sectional units 11.

Figure 9A:
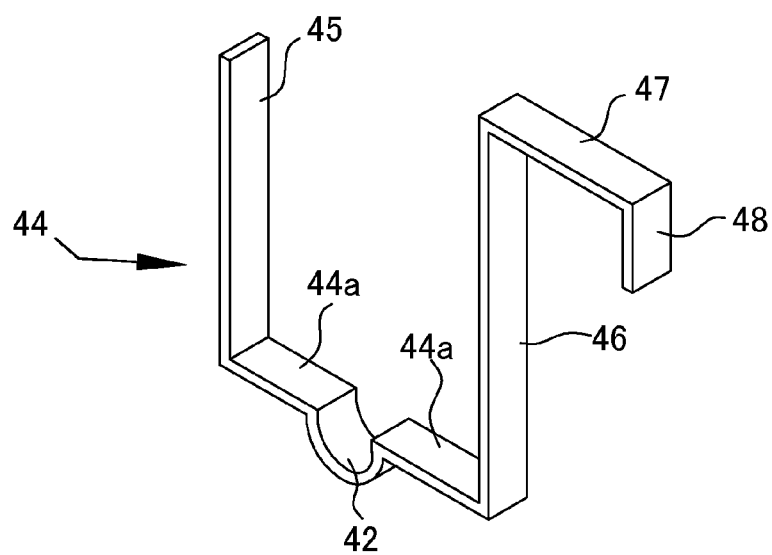
FIG. 9A illustrates an isometric view of the U-shaped support bracket having a pair of upstanding leg portions with one of the leg portions being of greater length including an L-shaped or hook-like member to be hung and supported across a top surface of a wall member and a bottom horizontal interconnecting leg portion including a downward semi-circle or C-shaped area for supporting and conforming to the drain channels of the molded elongated modular planter or flower box sectional unit according to the present invention.

FIG. 9A illustrates an isometric view of the U-shaped support bracket member 44 of FIG. 9 above. This U-shaped support bracket member 44 has an L-shaped mounting arm or hook-like portion or member 47 and 48 to be hung and supported across a top surface of a wall member (not shown). Also, this U-shaped support bracket member 44 includes a short leg portion 45, a longer leg portion 46 and a bottom horizontal leg portion 44a that is connected to a lower bottom end of each of the short leg portion 45 and the longer leg portion 46. The bottom leg portion 44a includes a downward extending semi-circle or C-shaped area portion 42 for supporting and conforming to the drain channels 15 of the molded elongated modular planter or flower box sectional units 11 for stabilization purpose.

Figure 10:
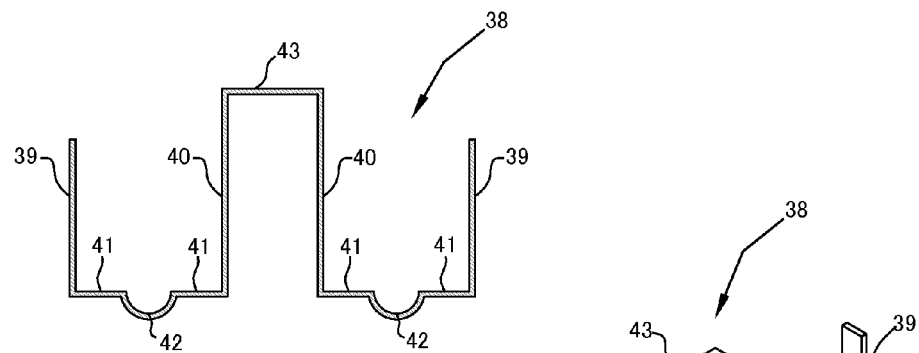
FIG. 10 illustrates a front perspective view of a pair of U-shaped support brackets having a pair of upstanding leg portions with one of the leg portions of each pair being of greater length and connected together by an elongated leg member to double hang and support a plurality of modular planter or flower box sectional units across a top surface of a wall member and a bottom horizontal interconnecting leg portion of each pair including a downward semi-circle or C-shaped area for supporting and conforming to the drain channels of the molded elongated modular planter or flower box sectional unit according to the present invention.

FIG. 10 illustrates a front perspective view of a pair of joining double U-shaped support bracket member 38 having a pair of upstanding leg portions 39 and 40 with one of the leg portions 40 of each pair being of greater length and connected together by an upper elongated leg member 43 to double hang and support a plurality of modular planter or flower box sectional units 11 across a top surface of the wall member or structure 64 (shown in FIGS. 11 and 12) and a bottom horizontal interconnecting leg portion 41 of each pair including a downward semi-circle or C-shaped area portion 42 for supporting and conforming to the drain channels 15 of the molded elongated modular planter or flower box sectional unit 11 for stabilization purpose.

Figure 10A:
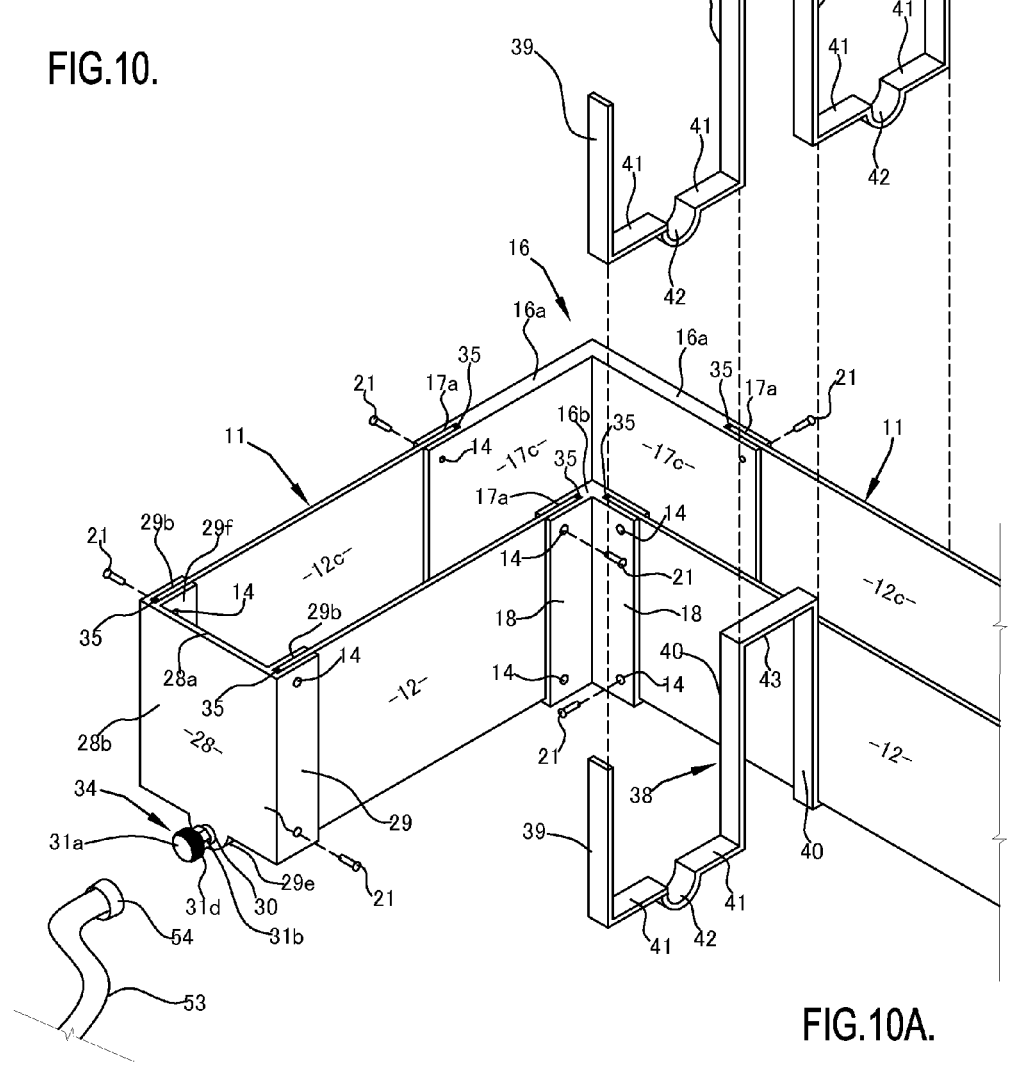
FIG. 10A illustrates a cut-sectional perspective view of a pair of U-shaped support brackets having a pair of upstanding leg portions with one of the leg portions of each pair being of greater length and connected together by an elongated leg member to double hang and support a plurality of modular planter or flower box sectional units with an end cap and drain means across a top surface of a wall member and a bottom horizontal interconnecting leg portion of each pair including a downward semi-circle or C-shaped area for supporting and conforming to the drain channels of the molded elongated modular planter or flower box sectional units according to the present invention.

FIG. 10A illustrates a cut-sectional perspective view of a plurality of the molded elongated modular planter or flower box sectional units 11 connected to a 90° coupling connector 16 and being supported and stabilized within the downward semi-circle or C-shaped area portion 42 of the double U-shaped bracket member 38.

Furthermore, FIG. 10A shows each pair of the double U-shaped bracket member having a first short leg portion 39, a longer leg portion 40, a bottom horizontal leg portion 41 that is connected to the lower bottom end of each of the first short leg portions 39 and the longer leg portions 40. The bottom horizontal leg portion 41 includes a semi-circle or C-shaped cavity 42 in a central portion thereof. This semi-circle or C-shaped cavity 42 is designed to cooperate and conform to the drain channels 15 of the downward semi-circle or C-shaped area portion 42 for supporting and conforming to the drain channels 15 of the molded elongated modular planter or flower box sectional units 11 for stabilization purpose.

A top horizontal leg portion 43 is connected to each of the long leg portions 40 to make the double U-shaped bracket member 38 a single unit. This interconnected top horizontal leg portion 43 is disposed across the top of a wall structure, so that the double U-shaped bracket member 38 can support a pair of molded continuous leak-proof modular E-Z garden planter or flower box assembly units 10 on opposite sides of the wall structure or member 64 (shown in FIGS. 11 and 12), such as the top of wall of decks, patios, balconies, windows, porches, roof tops, fences, brick and/or concrete barrier walls, other building wall structures and any other elevated surfaces.

Also, FIG. 10A shows an end cap 28 with the U-shaped male end 12a of one of the plurality of molded elongated modular planter or flower box sectional units 11 being sealingly secured by the seal leg portion 35, as shown, of the seal member assembly 34 within the U-shaped cavity 29a of the end cap 28 by fastening members 21 through the spaced apart and aligned holes 14 of the upstanding or vertically extending inner side walls 29f and outer side walls 29 as previously discussed above. The other male end 12b of the molded elongated modular planter or flower box sectional units 11 is sealingly secured by the seal leg portion 35, as shown, of the seal member assembly 34 within the U-shaped cavity 17a of one end of the 90° coupling connector 16 by fastening members 21 through the spaced apart and aligned holes 14 of the male end 12b of the upstanding outer side walls 12 and the inner side walls 12c and the pair of upstanding or vertically extending inner side walls 17c and 18a and outer side walls 17 and 18. Another U-shaped male end 12a of another one of the plurality of molded elongated modular planter or flower box sectional units 11, which shows a sectional cut, is inserted and sealingly secured in the other U-shaped cavity 17a of the 90° coupling connector 16 by fastening members 21 through the spaced apart and aligned holes 14 of the male end 12a of the upstanding outer side walls 12 and the inner side walls 12c and the pair of upstanding or vertically extending inner side walls 17c and 18a and outer side walls 17 and 18 as previously discussed above. For a clearer understanding of FIG. 10A, see the recited discussion above for FIGS. 1-2 and 5-5B. Also, details on the drain adapter 31 and the drain hose 53 and 54 will not be discussed here, see the discussion above for FIGS. 7-7D.

FIG. 11 illustrates a cut-sectional perspective view of a molded elongated modular planter or flower box sectional unit 11 with upstanding outer side walls 12 and the inner side walls 12c including soil 58 disposed therein for planting flowers, vegetation or plants 59 within the soil 58. The U-shaped bracket member 44 (see FIGS. 9 and 9A for the detailed discussion) being disposed about the molded elongated modular planter or flower box sectional unit 11 and having the L-shaped or hook-like member 47 and 48 to be hung and supported across the top of the wall structure or member 64. Also, the U-shaped bracket member 44 support and conforms to the drain channels 15 disposed on a bottom surface of the molded elongated modular planter or flower box sectional unit for stabilization purpose.

FIG. 11A illustrates a front perspective view of a molded elongated modular planter or flower box sectional unit 11 with the upstanding outer side walls 12 and the inner side walls 12c including soil 58 disposed therein for planting flowers, vegetation or plants 59 within the soil 58. The U-shaped bracket member 44 (see FIGS. 9 and 9A for the detailed discussion) being disposed about the molded elongated modular planter or flower box sectional unit 11 and having the L-shaped or hook-like member 47 and 48 that is connected to the longer leg portion 46 to be hung and supported across the top of the wall structure or member 64. Also, the U-shaped bracket member 44 shows a semi-circle or C-shaped member portion 42 that is supported and conformed to the semi-circle or C-shaped drain channels 15 that is disposed on the bottom surface of the molded elongated modular planter or flower box sectional unit 11 to stabilize the molded elongated modular planter or flower box sectional unit 11 when co-operably associated with the wall structure. Note that 15a shows one of the spaced apart drain holes in the bottom lower wall 13 of the U-shaped molded elongated modular planter or flower box sectional unit 11, which communicates with the semi-circle or C-shaped drain channels 15.

FIG. 12 illustrates a cut-sectional perspective view of a plurality of molded elongated modular planter or flower box sectional units 60 having a pair of upstanding outer side walls 61 and inner side walls 61c interconnected by a bottom wall 62 at its lower ends with a decorative design 63 disposed on the pair of upstanding or vertical extending outer side walls 61 thereof. The plurality of molded elongated modular planter or flower box sectional units 60 are joined together by a 180° double-walled coupling connector 55 (see FIGS. 4-4B for more details) and including soil 58 for planting flowers, vegetation or plants 59 therein. A single U-shaped bracket member 44 with an L-shaped or hook-like member 47 and 48 is adapted to be hung and supported across the top of a wall structure 64 and supporting and conforming to the semi-circle or C-shaped drain channels 15 disposed on a bottom surface of the molded elongated modular planter or flower box sectional unit 60. The U-shaped male ends 12a and 12b are inserted and sealingly secured within U-shaped cavities 56b at both ends of the 180° double-walled coupling connector 55 by the plurality of the fastening members 21 through the plurality of spaced and aligned holes 14 in the plurality of molded elongated modular planter or flower box sectional units 60 and a pair of upstanding or vertically extending outer side walls 56 and inner side walls 56d of the 180° double-walled coupling connector 55 (see FIGS. 4-4B for more details).

It is to be noted that the decorative design 63 can take on different types of forms and shapes on the pair of upstanding or vertical extending outer side walls 61, if desired.

Optionally, an irrigation system not shown can be removably attached over the top of or along the sides and extending over the plurality of molded elongated modular planter or flower box sectional units 11 and 60. Also, the irrigation system could be removably secured to the wall structure that the plurality of molded elongated modular planter or flower box sectional units 11 and 60 are supported on and designed to extend at a selected distance over the top of the plurality of molded elongated modular planter or flower box sectional units 11 and 60. Note that the irrigation systems can be of different types.

The irrigation system is designed to provide a dripping water action that will evenly distribute the required amount of watering, irregardless of the length of the improved molded continuous modular and leak-proof E-Z garden planter or flower box assembly unit 10. This dripping action will prevent over watering the plants or vegetation in the improved molded continuous modular and leak-proof E-Z garden planter or flower box assembly unit 10 to avoid plant or vegetation roots from decomposing or decaying and to avoid the souring or spoiling of the soil, which will stun the growth or the killing of the plants or vegetation. This even water distribution is a direct result of the selected spacing of the aforementioned drain hoes 15*a* and a selected water dripping action that is set by a timer or timing device (not shown).

It is being noted that the plurality of U-shaped molded elongated modular planter or flower box sectional units 11 and 60 can be of different desired shapes, dimensions, colors and designs. The U-shaped molded elongated modular planter or flower box sectional units 11 and 60, for example, can be square, rectangular, curved and so forth in shape.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiments, and examples, but by all embodiments and methods within the scope and spirit of the invention as claimed.

What is claimed is:

1. An improved molded and elongated modular planter or flower box sectional unit assembly comprising:
    a plurality of U-shaped molded and elongated modular planter or flower box sectional units; each U-shaped molded and elongated modular planter or flower box sectional unit includes a pair of vertically extending side wall members, a bottom wall member interconnecting the pair of vertically extending side wall members at its lower ends, the pair of vertically extending side wall members and the bottom wall member define a pair of male U-shaped securing ends with spaced apart securing holes disposed along the pair of vertically extending side wall members and an open top end;
    a plurality of spaced apart drain holes being disposed in each bottom wall member;
    an elongated male semi-circle or C-shaped drain channel extending downward and underneath each of the bottom wall members along its entire length and being in drain communication with the plurality of spaced apart drain holes;
    a plurality of U-shaped bracket means for conforming to and receiving therein the elongated male semi-circle or C-shaped drain channel to achieve stabilization for the plurality of U-shaped molded and elongated modular planter or flower box sectional units when the plurality of U-shaped bracket members are removably attached to a wall structure for elevating the plurality of U-shaped molded and elongated modular planter or flower box sectional unit above a floor or ground surface;
    a plurality of U-shaped connectors, each having a female U-shaped securing end at opposite ends thereof, each U-shaped connector has a bottom wall member with a downward extending female semi-circle or C-shaped drain channel extending downward and underneath each of the bottom wall members of the U-shaped connectors;
    a U-shaped seal member with a downward extending male semi-circle or C-shaped portion with a drain opening there through being configured to seal within the U-shaped securing ends of the plurality of U-shaped connectors and the male semi-circle or C-shaped portion being received within each of the downward extending female semi-circle or C-shaped drain channels of the plurality of U-shaped connectors when each of the elongated male semi-circle or C-shaped drain channels are slidably received within each respective female semi-circle or C-shaped drain channel of the plurality of U-shaped connectors and each of the male securing ends of the U-shaped molded and elongated modular planter or flower box sectional units are simultaneously slidable into a sealing engagement with the downward extending male semi-circle or C-shaped portion of the U-shaped seal member to join the plurality of U-shaped molded and elongated modular planter or flower box sectional units and the plurality of U-shaped connectors together, whereby an effective drainage will communicate through each of the elongated male semi-circle or C-shaped drain channels, each of the female semi-circle or C-shaped drain channels and each drain opening of each of the male semi-circle or C-shaped portions of the U-shaped seal member to a remote drain location.

2. The improved molded and elongated modular planter or flower box sectional unit assembly according to claim 1, wherein the plurality of U-shaped molded and elongated modular planter or flower box sectional units and the plurality of U-shaped connectors being connected together to form a single continuous and unitary device.

3. The improved molded and elongated modular planter or flower box sectional unit assembly according to claim 2, wherein the plurality of U-shaped bracket means includes a plurality of U-shaped and spaced apart bracket members disposed about and supporting the plurality of U-shaped molded and elongated modular planter or flower box sectional units.

4. The improved molded and elongated modular planter or flower box sectional unit assembly according to claim 3, wherein each of the plurality of U-shaped and spaced apart bracket members includes a pair of vertically extending side leg members with one side leg member being shorter than the other side leg member, a bottom leg member interconnecting the pair of vertically extending side leg members at its lower ends and the bottom leg member having a central portion with a semi-circle or C-shaped cavity extending downward there from to conform to and receive therein each of the elongated male semi-circle or C-shaped drain channels to support and stabilize the plurality of molded and elongated modular planter or flower box sectional units.

5. The improved molded and elongated modular planter or flower box sectional unit assembly according to claim 4, wherein each of the plurality of U-shaped and spaced apart bracket members includes at least one single U-shaped bracket member with a fastening hole disposed in an upper end of the longer side leg member of the at least one single U-shaped bracket member for receiving a fastening member there through to secure the longer side leg member to at least one of the plurality of molded and elongated modular planter or flower box sectional units.

6. The improved molded and elongated modular planter or flower box sectional unit assembly according to claim 4, wherein each of the plurality of U-shaped and spaced apart bracket members includes at least one U-shaped bracket member with an L-shaped leg member connected to a top end of the longer side leg member of the at least one U-shaped bracket member defining a hook-like member that will secure the at least one U-shaped bracket member across a top surface of a wall structure for elevating the plurality of U-shaped molded and elongated modular planter or flower box sectional units above a floor or ground surface.

7. The improved molded and elongated modular planter or flower box sectional unit assembly according to claim 4, wherein each of the plurality of U-shaped and spaced apart bracket members includes at least a pair of U-shaped bracket members defining a double U-shaped bracket unit with a horizontal leg member connected between a top end of a longer side leg member of each of the pair of U-shaped bracket members defining a support wall member for lying across the top surface of the wall structure for supporting a plurality of U-shaped molded and elongated modular planter or flower box sectional units disposed on opposite sides of the wall structure and elevating them above a floor or ground surface.

8. The improved molded and elongated modular planter or flower box sectional unit assembly according to claim 1, the plurality of U-shaped connectors further includes a plurality of different angular shaped coupling connectors for coupling the plurality of U-shaped molded and elongated modular planter or flower box sectional units at their U-shaped securing ends.

9. The improved molded and elongated modular planter or flower box sectional unit assembly according to claim 8, wherein the plurality of different angular shaped coupling connectors having angular configurations selected from the group consisting at least of 22°, 90° and 180°.

10. The improved molded and elongated modular planter or flower box sectional unit assembly according to claim 8, wherein each of the plurality of different angular shaped coupling connectors includes a pair of inner and outer upstanding or vertically extending side walls, a bottom inner wall that interconnects the inner upstanding or vertically extending side walls at its lower ends, a bottom outer wall that interconnects the outer upstanding or vertically extending side walls at its lower ends, each of the U-shaped securing ends having a U-shaped cavity formed between the inner and outer upstanding or vertically extending side walls, the bottom inner wall, the bottom outer wall and the downward extending female semi-circle or C-shaped drain channels, the U-shaped cavity having a selected depth defined by a back wall portion between the inner and outer upstanding or vertically extending side walls, the bottom inner wall, the bottom outer wall and the downward extending female semi-circle or C-shaped drain channels.

11. The improved molded and elongated modular planter or flower box sectional unit assembly according to claim 10, wherein each of the U-shaped cavity securing ends of the plurality of different angular coupling connectors receives a respective one of the U-shaped seal member therein, each of the U-shaped cavity securing ends having a pair of vertically extending side wall leg portions, a bottom horizontal wall portion that interconnects the pair of vertically extending side wall leg portions at its lower ends and the bottom horizontal wall portion having a central portion defining a downward extending semi-circle or C-shaped portion having an opening there through.

12. The improved molded and elongated modular planter or flower box sectional unit assembly according to claim 11, wherein the U-shaped seal member is fully inserted into the respective U-shaped cavity securing ends when the vertically extending side wall leg portions and the bottom horizontal wall portion engages the back wall portion of the respective U-shaped cavity securing ends, and when the downward extending semi-circle or C-shaped portion of the seal member is sealingly received within the female semi-circle or C-shaped cavity of each one of the plurality of different angular shaped coupling connectors.

13. The improved molded and elongated modular planter or flower box sectional unit assembly according to claim 12, wherein the female semi-circle or C-shaped cavity of the plurality of different angular shaped coupling connectors having a first larger dimension and the male semi-circle or C-shaped drain channels of the plurality of molded and elongated modular planter or flower box sectional units having a second smaller dimension that will easily and sealingly slide into the first larger dimension of the female semi-circle or C-shaped cavity of the plurality of different angular shaped coupling connectors when the U-shaped cavity securing ends of the plurality of molded and elongated modular planter or flower box sectional units are fully inserted into the U-shaped cavity securing ends and in abutting engagement with the back wall portion of the plurality of different angular coupling connectors and an end of the semi-circle or C-shaped drain channels of the plurality of molded and elongated modular planter or flower box sectional units is fully inserted into sealing and abutting engagement with the male semi-circle or C-shaped downward extending portion of the U-shaped seal member.

14. The improved molded and elongated modular planter or flower box sectional unit assembly according to claim 2, wherein the single continuous and unitary device comprising the plurality of connected U-shaped molded and elongated modular planter or flower box sectional units has a pair of drain end caps sealingly connected to close off two of the U-shaped securing ends of the single continuous and unitary device.

15. The improved molded and elongated modular planter or flower box sectional unit assembly according to claim 14, wherein each of the pair of drain end caps includes a common top wall of a front wall face and a rear wall face, a pair of U-shaped upstanding or vertically extending inner side walls at opposite sides thereof and connected to the rear wall face at the common top wall, a lower bottom inner wall that interconnects the plurality of upstanding or vertically extending inner side walls at its lower ends and at a lower end of the rear wall face, a pair of U-shaped upstanding or vertically extending outer side walls at opposite side thereof and connected to the front wall face at the common top wall, a lower bottom outer wall below the lower bottom inner wall that interconnects the plurality of upstanding or vertically extending outer side walls at its lower ends and the common top wall of the front wall face at its upper end to form a single molded cap member.

16. The improved molded and elongated modular planter or flower box sectional unit assembly according to claim 15, wherein the pair of U-shaped upstanding or vertically extending inner and outer side walls each having a rear end that extends rearward and outward of the front and rear wall faces defining a female U-shaped cavity there between, the U-shaped cavity extends from the front and rear wall faces to the rear ends of the pair of U-shaped upstanding or vertically extending inner and outer side walls, the selected depth of the female U-shaped cavity having the back wall portion near the rear ends of the pair of U-shaped upstanding or vertically extending inner and outer side walls that interconnects with the front and rear wall faces that is at least equal to the height of the pair of U-shaped upstanding or vertically extending inner and outer side walls and the lower bottom outer wall below the bottom inner wall that forms a bottom boundary wall for the female U-shaped cavity.

17. The improved molded and elongated modular planter or flower box sectional unit assembly according to claim 16, wherein the lower bottom outer wall of the female U-shaped cavity of each of the drain end caps has a central downward extending portion with a female semi-circle or C-shaped configuration forming a female channel portion that extends substantially along the entire length of the lower bottom outer wall of the female U-shaped cavity below the bottom inner wall to the back wall portion of the drain end caps.

18. The improved molded and elongated modular planter or flower box sectional unit assembly according to claim 17, wherein each female U-shaped cavity of the drain end caps being adapted to receive a U-shaped seal member having a pair of upstanding side wall leg portions and a bottom interconnecting leg portion with a central downward extending semi-circle or C-shaped shaped portion having an opening there through, the U-shaped seal member is fully inserted into each female U-shaped cavity of the drain end caps when the pair of upstanding side wall leg portions and the bottom interconnecting leg portion engages the back wall portion of each female U-shaped cavity and the downward extending semi-circle or C-shaped portion of the U-shaped seal member of a smaller dimension is sealingly and tightly received within the female semi-circle or C-shaped drain female channel portion of the end caps of a larger dimension to the back wall portion of each female U-shaped cavity, each of the male securing ends of the plurality of U-shaped molded and elongated modular planter or flower box sectional units is fully inserted and into abutting engagement with the U-shaped seal member of the end caps and at least a pair of spaced apart and aligned fastening holes being disposed in the upstanding or vertically inner and outer side walls of the end caps that receives at least a pair of fastening members that will be received there through to secure the male securing ends of the plurality of U-shaped molded and elongated modular planter or flower box sectional units within the end caps' U-shaped cavity and compressing the seal member therein and within the female semi-circle or C-shaped female channel portion of the end caps when each male semi-circle or C-shaped channel of the plurality of U-shaped molded and elongated modular planter or flower box sectional units is fully inserted into the female semi-circle or C-shaped female channel portion of the drain end caps, thereby preventing leakage within the U-shaped of cavity of each of the drain end caps and within the semi-circle or C-shaped drain channels of the plurality of U-shaped molded and elongated modular planter or flower box sectional units and the drain end caps.

19. The improved molded and elongated modular planter or flower box sectional unit assembly according to claim 17, wherein each of the drain end caps further includes a threaded opening through the front and rear wall faces at a lower end thereof, the threaded opening being in flow communication with the female semi-circle or C-shaped female channel portion of the drain end caps, the plurality of spaced apart drain holes and the plurality of drain channels of the plurality of U-shaped molded and elongated modular planter or flower box sectional units and the semi-circle or C-shaped cavity of each of the plurality of different angular coupling connectors being connected together as a continuous flow communication drain passage via a drain adapter connected to the end caps to evacuate excess water from the plurality of connected U-shaped molded and elongated modular planter or flower box sectional units to a desired location to prevent unwanted water accumulation to a floor or ground surface.

20. The improved molded and elongated modular planter or flower box sectional unit assembly according to claim 19, wherein a drain adapter is adapted to be threaded into the threaded opening of the end caps, the drain adapter having a first front threaded end surface of a first dimension on a front end, a second rear threaded end surface of a second dimension being smaller than the first dimension, a nut member being positioned behind the first front threaded surface, a solid stop member being disposed between the second rear threaded surface and the nut member and a drain opening that extends through the drain adapter from the first front threaded end surface to the second rear threaded end surface, the nut member being a little larger than the first front threaded end surface so that a tool means or a user's hand can easily grasp an outer surface of the nut member to easily thread the drain adapter into and out of the threaded opening, whereby, when the drain adapter is threaded into the threaded opening and the solid stop member butts up against the lower central wall portion downward extending surface of the front wall face, to give a user an indication that the drain adapter has been fully inserted and tightened to the required degree within the threaded opening to thereby eliminate over tightening and the damaging of the smaller dimensioned rear threaded end and the threaded opening, as well as providing an effective threaded sealing arrangement to prevent leakage.

21. The improved molded and elongated modular planter or flower box sectional unit assembly according to claim 20, wherein the first front threaded end surface of the first dimension of the drain adapter includes a protective drain cap with a handle member on a front face of the drain cap to allow a user or different types of tool means to easily grasp in order for the drain cap to be easily threaded on or unthreaded from the first front threaded end surface, a tool aperture being disposed in a center portion of the handle member for allowing the different types of tool means to be inserted therein so that the drain cap can be easily threaded on or unthreaded from the first front threaded end surface, and a back end of the drain cap being threaded about the first front threaded end surface, whereby, the back end of the drain cap will abut the drain adapter nut member giving a user an indication that the cap is fully engaged and tightened to a required degree, which will eliminate over tightening and the damaging of the first front threaded end surface and the threaded back end of the drain cap.

22. The improved molded and elongated modular planter or flower box sectional unit assembly according to claim 2, wherein all components of the plurality of U-shaped molded and elongated modular planter or flower box sectional units defining the single continuous and unitary device are made of a material selected from the group of polymer type materials consisting of Polyvinyl Chloride (PVC), polypropylene (PP), or Ethylene Propylene (EP), other known plastics, hard rubber-like material and made of a material selected from the group of metal materials consisting at least of aluminum and stainless steel.

23. A molded and elongated modular E-Z planter device adapted for containing plants or vegetation therein, the molded and elongated modular E-Z planter device comprising:

a plurality of U-shaped molded and elongated modular planter containers; each of the U-shaped containers includes a pair of upstanding side wall members, a bottom wall member interconnecting the pair of upstanding side wall members at its lower ends, an open top end, the pair of upstanding side wall members and the bottom wall member defining a pair of U-shaped male open securing ends with spaced apart securing holes disposed along the pair of upstanding side wall members adjacent the male open securing ends;

a plurality of spaced apart drain holes being disposed in each bottom wall member;

a bottom surface of each of the plurality of U-shaped containers include male semi-circle or C-shaped drain channels that extend downward and underneath the bottom wall member along its entire length and being in drain communication with the plurality of spaced apart drain holes;

a plurality of coupling connectors each having a plurality of side walls, a bottom wall connected to the plurality of side walls, an open top end and a pair of opposite open ends defining a double-walled female U-shaped cavity formed in the plurality of side walls and the bottom wall at each opposite open end, a central portion of the bottom wall below the double-walled female U-shaped cavity defining a downward extending semi-circle or C-shaped female cavity at each opposite open end along its entire length;

a first U-shaped seal means having a configuration with a portion that conforms to and is inserted into the double-walled female U-shaped cavity against a back wall portion therein and another portion that conforms to and is inserted into the downward extending semi-circle or C-shaped female cavity; and the U-shaped male open securing ends are adapted to be slidably inserted into the double-walled female U-shaped cavities of the coupling connectors and into sealing engagement with the seal means portion disposed therein and the male semi-circle or C-shaped drain channels of the plurality of U-shaped containers are adapted to be slidably inserted into the female semi-circle or C-shaped female cavities and into sealing engagement with the another portion of the seal means disposed therein for connecting the plurality of U-shaped containers together to form a single continuous elongated modular E-Z planter assembly.

24. A molded and elongated modular E-Z planter device according to claim 23, wherein each U-shaped male open securing ends at opposite ends of each U-shaped molded and elongated modular planter containers are closed off by a pair of drain end caps, each of the pair of drain end caps includes a front face and a rear face, a pair of upstanding side walls connected to the front and rear faces, a bottom wall connected to the pair of upstanding side walls, the front and rear faces defining a female double-walled U-shaped cavity extending rearward of the front and rear faces and a downward extending semi-circle or C-shaped drain cavity, and a second U-shaped seal means having a configuration with a portion that conforms to and is inserted into the double-walled female U-shaped cavity against a back wall portion of each of the drain end caps and another portion that conforms to and is inserted into the downward extending semi-circle or C-shaped drain cavity of each of the drain end caps.

25. A molded and elongated modular E-Z planter device according to claim 24, wherein the opposite U-shaped male open securing ends are adapted to be slidably inserted into the double-walled female U-shaped cavities of the drain end caps and into sealing engagement with the second seal means portion disposed therein and the male semi-circle or C-shaped drain channels of the plurality of U-shaped containers are adapted to be slidably inserted into the semi-circle or C-shaped drain cavities of the drain end caps and into sealing engagement with the another portion of the second seal means disposed therein for connecting the plurality of U-shaped containers together to form the single continuous elongated modular E-Z planter assembly.

26. A molded and elongated modular E-Z planter device according to claim 25, wherein each of the drain end caps includes an adapter means having a drain hose attached thereto and adapted to be removably attached to a drain opening disposed at a selected location on the front face thereof and in flow communication with the semi-circle or C-shaped drain cavities of the drain end caps, the spaced apart drain holes and the male drain channels of the plurality of the U-shaped containers being configured to constantly drain excess water from the plurality of the U-shaped containers to a desired location for recycling an even distribution of water back to the plurality of the U-shaped containers when required.

27. A molded and elongated modular E-Z planter device according to claim 23, wherein a plurality of U-shaped and spaced apart brackets means being disposed about the plurality of U-shaped containers, each of the plurality of U-shaped and spaced apart bracket means includes a pair of vertically extending side leg members with one side leg member being shorter than the other side leg member, a bottom leg member interconnecting the pair of vertically extending side leg members at its lower ends and the bottom leg member having a central portion with a semi-circle or C-shaped cavity extending downward there from to conform to and receive therein the male semi-circle or C-shaped drain channel to support and stabilize the single continuous elongated modular E-Z planter assembly.

28. A molded and elongated modular E-Z planter device according to claim 27, wherein each of the plurality of spaced apart brackets means includes:

at least one single U-shaped bracket member including a fastening hole disposed in an upper end of the other side leg member of the at least one single U-shaped bracket member for receiving a fastening member there through to secure the other side leg member to at least one of the plurality of U-shaped molded and elongated modular planter containers;

at least one second U-shaped bracket member including an L-shaped leg member connected to a top end of the other side leg member of the at least one second U-shaped bracket member defining a hook-like member that will secure the at least one U-shaped bracket member across a top surface of a wall structure for supporting and elevating the single continuous elongated modular E-Z planter assembly above a floor or ground surface; and at least one third U-shaped bracket member including at least a pair of U-shaped bracket members defining a double U-shaped bracket unit with a horizontal leg member connected between a top end of each of the other side leg members of the pair of U-shaped bracket members defining a support wall member for lying across the top surface of the wall structure for supporting a separate single continuous elongated modular E-Z planter assembly on opposite sides of the wall structure and elevating them above a floor or ground surface.

29. A molded and elongated modular E-Z planter device according to claim 23, wherein all components of the single continuous elongated modular E-Z planter assembly are made of a material selected from the group of polymer type materials consisting of Polyvinyl Chloride (PVC), polypropylene (PP), or Ethylene Propylene (EP) other known plastics, hard rubber-like material and made of a material selected from the group of metal materials consisting at least of aluminum and stainless steel.

30. A modular planter assembly comprising:

a plurality of U-shaped holding units, each having a pair of side walls with open male ends and a bottom wall with a plurality of spaced apart drain holes therein, an elongated male drain channel disposed underneath the bottom wall and in flow communication with the spaced apart drain holes and the pair of side walls having a decorative design disposed thereon;

a U-shaped seal means having a pair of vertically extending side legs and a bottom connecting leg with a central downward extending sealing portion;

a plurality of different angular shaped coupling connectors, each having U-shaped cavities at opposite securing ends thereof and a lower female drain receiving cavity extending downward there from for receiving and securing the U-shaped seal means side legs and the central downward extending sealing portion in the U-shaped cavities and in the lower female drain receiving cavity with the open male ends being inserted into each of the U-shaped cavities at the opposite securing ends for compressing the U-shaped seal means therein to form a single unit;

a plurality of U-shaped bracket means, each having a lower central cavity portion for supporting and receiving the elongated male drain channels of the U-shaped holding units therein, at least one of the plurality of bracket means having a portion being secured to the U-shaped holding units, at least a second one of the plurality of U-shaped bracket means including a portion for securing to a wall structure, and at least a third one of the plurality of U-shaped bracket means including a pair of U-shaped bracket members with a support leg connected to an upper portion of the pair of U-shaped bracket members for extending across a wall structure and supported thereon to secure the modular planter assembly on opposite sides of the wall structure; and a pair of drain end caps, each including a front face, a rear face and a pair of side walls extending outward from the front and rear faces at a back side defining a U-shaped double wall cavity extending to a back wall portion therein with a downward extending drain cavity, and the front face has a drain opening in flow communication with the downward extending drain cavity for receiving a drain adapter therein with a drain hose attached thereto for constantly draining excess water from the modular planter assembly; and each drain end cap receives the U-shaped seal within the U-shaped cavities therein and the downward extending sealing portion being received in the drain cavity of the drain end caps and the open male ends of the plurality of U-shaped holding units being inserted into abutting engagement with the U-shaped seal means and secured by fastening means therein, the male drain channels of the plurality of holding units are slidably fitted into the lower female drain cavities of the different angular shaped coupling connectors and into abutting and sealing engagement with the central downward extending sealing portion disposed therein forming a continuous drainage channel to the drain hose of the drain adapter for releasing excess water from the plurality of spaced apart drain holes of the modular planter assembly via the drain hose to a desired location and back to the modular planter assembly with an even amount of distributed water thereto when needed.

\* \* \* \* \*